(12) United States Patent
Rajaram

(10) Patent No.: US 8,032,865 B2
(45) Date of Patent: *Oct. 4, 2011

(54) SYSTEM AND METHOD FOR FIELD DIAGNOSIS OF WIRELESS COMMUNICATIONS DEVICE SYSTEM SOFTWARE

(75) Inventor: Gowri Rajaram, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1597 days.

This patent is subject to a terminal disclaimer.

(21) Appl. No.: 11/174,090

(22) Filed: Jun. 29, 2005

(65) Prior Publication Data
US 2005/0245248 A1 Nov. 3, 2005

Related U.S. Application Data

(63) Continuation of application No. 09/970,188, filed on Oct. 3, 2001, now Pat. No. 6,918,108, which is a continuation-in-part of application No. 09/917,026, filed on Jul. 26, 2001, now Pat. No. 7,328,007, and a continuation-in-part of application No. 09/916,460, filed on Jul. 26, 2001, now Pat. No. 7,159,214, and a continuation-in-part of application No. 09/916,900, filed on Jul. 26, 2001.

(51) Int. Cl.
G06F 9/44 (2006.01)
G06F 9/45 (2006.01)
(52) U.S. Cl. .......................... 717/126; 717/127; 717/129
(58) Field of Classification Search .......... 717/124–130, 717/168–175, 140–143, 151–154
See application file for complete search history.

(56) References Cited

U.S. PATENT DOCUMENTS

| | | | |
|---|---|---|---|
| 4,852,047 A * | 7/1989 | Lavallee et al. | ................. 700/86 |
| 5,046,082 A | 9/1991 | Zicker et al. | |
| 5,337,255 A | 8/1994 | Seidel et al. | |
| 5,400,389 A | 3/1995 | Niiyama et al. | |
| 5,481,706 A | 1/1996 | Peek | |
| 5,507,009 A | 4/1996 | Grube et al. | |
| 5,600,823 A | 2/1997 | Sherer et al. | |
| 5,673,317 A | 9/1997 | Cooper | |
| 5,699,275 A | 12/1997 | Beasley et al. | |
| 5,715,462 A | 2/1998 | Iwamoto et al. | |

(Continued)

FOREIGN PATENT DOCUMENTS
DE 19502728 8/1996

(Continued)

OTHER PUBLICATIONS

Moher, "Provide: A process visulization and debugging", IEEE, Trans. on software engineering, vol. 16, No. 6, pp. 849-857, 1988.*

(Continued)

*Primary Examiner* — Anil Khatri

(57) ABSTRACT

A system and method are provided for field diagnosing system software in a wireless communications device. The method comprises: executing system software; launching a run-time engine; receiving patch manager run time instructions (PMRTI), including dynamic instruction sets and new code sections, in a file system section nonvolatile memory; and, processing dynamic instruction sets to field diagnose the system software. Processing the dynamic instruction sets includes: executing the diagnosis instruction sets with the system software to collect data; analyzing the collected data; and, in response to analyzing the collected data, operating on system data and system software. The method further comprises: following the operating on the system software and system data, executing the system software.

42 Claims, 23 Drawing Sheets

U.S. PATENT DOCUMENTS

| | | | |
|---|---|---|---|
| 5,734,904 A | | 3/1998 | Kanamori et al. |
| 5,740,351 A | * | 4/1998 | Kasten .................. 714/35 |
| 5,771,386 A | | 6/1998 | Baumbauer |
| 5,784,537 A | | 7/1998 | Suzuki et al. |
| 5,790,704 A | | 8/1998 | Rao et al. |
| 5,790,856 A | * | 8/1998 | Lillich .................. 717/163 |
| 5,826,005 A | * | 10/1998 | Fuller .................. 714/38 |
| 5,832,086 A | | 11/1998 | Rosauer |
| 5,835,749 A | * | 11/1998 | Cobb .................. 719/331 |
| 5,835,778 A | | 11/1998 | Yoshihara |
| 5,867,712 A | * | 2/1999 | Shaw et al. .................. 717/127 |
| 5,875,242 A | | 2/1999 | Glaser et al. |
| 5,901,225 A | * | 5/1999 | Ireton et al. .................. 714/7 |
| 5,920,826 A | | 7/1999 | Metso et al. |
| 5,930,704 A | | 7/1999 | Kay |
| 5,938,766 A | | 8/1999 | Anderson et al. |
| 5,950,006 A | * | 9/1999 | Crater et al. .................. 717/140 |
| 5,960,356 A | | 9/1999 | Alperovich et al. |
| 5,974,312 A | | 10/1999 | Hayes et al. |
| 6,018,543 A | | 1/2000 | Blois et al. |
| 6,023,620 A | | 2/2000 | Hansson |
| 6,026,400 A | | 2/2000 | Suzuki |
| 6,047,071 A | | 4/2000 | Shah |
| 6,138,009 A | | 10/2000 | Birgerson |
| 6,138,153 A | | 10/2000 | Collins et al. |
| 6,145,098 A | | 11/2000 | Nouri et al. |
| 6,151,709 A | * | 11/2000 | Winkel .................. 717/173 |
| 6,195,546 B1 | | 2/2001 | Leung et al. |
| 6,212,632 B1 | * | 4/2001 | Surine et al. .................. 713/2 |
| 6,237,114 B1 | * | 5/2001 | Wookey et al. .................. 714/47 |
| 6,247,065 B1 | | 6/2001 | Greenspan et al. |
| 6,272,333 B1 | | 8/2001 | Smith |
| 6,275,694 B1 | | 8/2001 | Yoshida et al. |
| 6,308,061 B1 | | 10/2001 | Criss et al. |
| 6,343,375 B1 | * | 1/2002 | Gupta et al. .................. 717/152 |
| 6,351,636 B2 | | 2/2002 | Shaffer et al. |
| 6,370,455 B1 | * | 4/2002 | Larson et al. .................. 701/33 |
| 6,415,266 B1 | | 7/2002 | Do |
| 6,442,660 B1 | | 8/2002 | Henerlau et al. |
| 6,449,476 B1 | | 9/2002 | Hutchison et al. |
| 6,457,174 B1 | | 9/2002 | Kuroda et al. |
| 6,460,070 B1 | | 10/2002 | Turek et al. |
| 6,470,447 B1 | | 10/2002 | Lambert et al. |
| 6,477,702 B1 | * | 11/2002 | Yellin et al. .................. 717/126 |
| 6,493,549 B1 | | 12/2002 | Axelson et al. |
| 6,493,871 B1 | | 12/2002 | McGuire et al. |
| 6,498,789 B1 | | 12/2002 | Honda |
| 6,546,492 B1 | | 4/2003 | Walker et al. |
| 6,549,770 B1 | | 4/2003 | Marran |
| 6,578,056 B1 | | 6/2003 | Lamburt |
| 6,578,142 B1 | | 6/2003 | Anderson et al. |
| 6,611,822 B1 | * | 8/2003 | Beams et al. .................. 706/11 |
| 6,622,017 B1 | | 9/2003 | Hoffman |
| 6,633,759 B1 | | 10/2003 | Kobayashi |
| 6,643,506 B1 | | 11/2003 | Criss et al. |
| 6,714,992 B1 | | 3/2004 | Kanojia et al. |
| 6,731,946 B1 | | 5/2004 | Stanwood et al. |
| 6,754,894 B1 | | 6/2004 | Costello et al. |
| 6,754,895 B1 | | 6/2004 | Bartel et al. |
| 6,763,252 B2 | | 7/2004 | Itazawa |
| 6,785,541 B2 | | 8/2004 | Martin |
| 6,804,813 B1 | * | 10/2004 | Willems et al. .................. 717/125 |
| 6,918,108 B2 | * | 7/2005 | Rajaram .................. 717/126 |
| 6,934,931 B2 | * | 8/2005 | Plumer et al. .................. 717/104 |
| 6,950,847 B2 | | 9/2005 | Harrisville-Wolff et al. |
| 6,959,192 B1 | | 10/2005 | Cannon et al. |
| 6,968,546 B2 | * | 11/2005 | Lueh .................. 717/158 |
| 6,990,660 B2 | | 1/2006 | Moshir et al. |
| 7,017,116 B2 | * | 3/2006 | Elsbree et al. .................. 715/740 |
| 7,065,347 B1 | | 6/2006 | Vikse et al. |
| 7,069,452 B1 | * | 6/2006 | Hind et al. .................. 713/1 |
| 7,096,416 B1 | * | 8/2006 | Smith et al. .................. 715/203 |
| 7,140,007 B2 | * | 11/2006 | Lamping .................. 717/154 |
| 7,237,234 B2 | * | 6/2007 | Granston et al. .................. 717/151 |
| 7,287,243 B2 | * | 10/2007 | Dollin et al. .................. 717/126 |
| 7,305,666 B2 | * | 12/2007 | Burger et al. .................. 717/140 |
| 7,359,831 B2 | * | 4/2008 | Shrivastava et al. .................. 702/182 |
| 7,401,323 B2 | * | 7/2008 | Stall et al. .................. 717/130 |
| 7,562,208 B1 | * | 7/2009 | Reed et al. .................. 713/1 |
| 7,647,586 B2 | * | 1/2010 | Long et al. .................. 717/129 |
| 7,694,282 B2 | * | 4/2010 | Arkhipov et al. .................. 717/129 |
| 7,730,453 B2 | * | 6/2010 | Swafford .................. 717/124 |
| 7,739,664 B2 | * | 6/2010 | Bates et al. .................. 717/127 |
| 2001/0000538 A1 | | 4/2001 | Kowaguchi |
| 2001/0005861 A1 | | 6/2001 | Mousseau et al. |
| 2001/0019953 A1 | | 9/2001 | Furukawa et al. |
| 2001/0027500 A1 | | 10/2001 | Matsunaga |
| 2001/0051519 A1 | | 12/2001 | Shirai |
| 2001/0054161 A1 | | 12/2001 | Woodruff |
| 2002/0019973 A1 | | 2/2002 | Hayashida |
| 2002/0026634 A1 | | 2/2002 | Shaw |
| 2002/0065041 A1 | | 5/2002 | Lunsford et al. |
| 2002/0072359 A1 | | 6/2002 | Moles et al. |
| 2002/0077077 A1 | | 6/2002 | Rezvani et al. |
| 2002/0083142 A1 | | 6/2002 | Lagosanto et al. |
| 2002/0083143 A1 | | 6/2002 | Cheng |
| 2002/0131397 A1 | | 9/2002 | Patel et al. |
| 2002/0142762 A1 | | 10/2002 | Chmaytelli et al. |
| 2002/0152268 A1 | | 10/2002 | Kureshy et al. |
| 2002/0160763 A1 | | 10/2002 | Mittal et al. |
| 2002/0161796 A1 | | 10/2002 | Sylthe |
| 2002/0170039 A1 | | 11/2002 | Kovacevic |
| 2003/0014561 A1 | | 1/2003 | Cooper |
| 2003/0060189 A1 | | 3/2003 | Minear et al. |
| 2003/0195013 A1 | | 10/2003 | Zicker et al. |
| 2004/0158829 A1 | | 8/2004 | Beresin et al. |
| 2004/0177072 A1 | | 9/2004 | Salminen et al. |
| 2004/0203768 A1 | | 10/2004 | Ylitalo et al. |
| 2004/0214551 A1 | | 10/2004 | Kim |
| 2004/0229644 A1 | | 11/2004 | Heie et al. |
| 2004/0240657 A1 | | 12/2004 | Camarillo |
| 2004/0249657 A1 | | 12/2004 | Kol et al. |
| 2004/0249768 A1 | | 12/2004 | Kontio et al. |
| 2004/0266422 A1 | | 12/2004 | Hotze et al. |
| 2005/0064847 A1 | | 3/2005 | Kirbas et al. |
| 2005/0079863 A1 | | 4/2005 | Macaluso |
| 2005/0209930 A1 | | 9/2005 | Coppinger et al. |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 9809208 | 3/1998 |
| WO | WO 9922325 | 5/1999 |
| WO | WO 00/67112 | 11/2000 |
| WO | WO 0073912 | 12/2000 |
| WO | WO 0074412 | 12/2000 |
| WO | WO 01/35686 | 5/2001 |
| WO | WO 02/058364 | 7/2002 |

OTHER PUBLICATIONS

Agarwal et al, "Detection of deadlock potentials in multithreaded programs", IBM J. Resh. & Dev. vol. 54, No. 5, paper 3, pp. 1-25, 2010.*

Hirzel et al, "On the usefulness of type and liveness accuracy for garbage collection and leak detection", ACM Trans. on Prog. Lang. and Sys.vol. 24, No. 6, pp. 593-624, 2002.*

Altekar et al, "ODR: output deterministic replay for multicore debugging", ACM SOSP, pp. 193-206, 2009.*

Zhang et al, "ConSeq: Detecting concurrency bugs through sequential errors", ACM ASPLOS, pp. 251-264, 2011.*

Guiagoussou et al., "Implementation of a Diagnostic and Troubleshooting Multi-Agent System for Cellular Networks", Int'l J Network Mgmnt., pp. 221-237, Aug. 1999.

* cited by examiner

326

| CODE SECTION ADDRESS TABLE | |
|---|---|
| IDENTIFIERS | ADDRESSES |
| CS_1 | START ADDRESS 1 (00100) |
| CS_2 | START ADDRESS 2 (00200) |
| ⋮ | ⋮ |
| CS_N | START ADDRESS N (00700) |
| PM | START ADDRESS P (01000) |

FIG. 5

|   | 0 | 1 | 2 | 3 | 4 | 5 | 6 | 7 |
|---|---|---|---|---|---|---|---|---|
| 0 |   |   |   | X |   |   |   |   |
| 1 |   |   |   |   |   | Y |   |   |
| ⋮ |   |   |   |   | ⋮ |   |   |   |
| n |   |   |   |   | Z |   |   |   |

SYMBOL LIBRARY 1

| SYMBOL OFFSET ADDRESS TABLE | | |
|---|---|---|
| SYMBOL ID | CODE SECTION ID | OFFSET |
| X_1 | CS_1 | 03 |
| Y_1 | CS_1 | 15 |
| P_1 | CS_2 | 11 |
| Q_1 | CS_2 | 33 |
| AA_3 | CS_2 | 47 |
| ⋮ | | |

FIG. 7

SYSTEM AND METHOD FOR FIELD DIAGNOSIS OF WIRELESS COMMUNICATIONS DEVICE SYSTEM SOFTWARE

This is a continuation of U.S. application Ser. No. 09/970,188, filed Oct. 3, 2001, now U.S. Pat. No. 6,918,108, which is a continuation in part of U.S. application Ser. No. 09/917,026, filed Jul. 26, 2001, now U.S. Pat. No. 7,328,007 and of U.S. application Ser. No.09/916,460, filed Jul. 26, 2001 now U.S. Pat. No. 7,159,214, and of U.S. application Ser. No. 09/916,900, filed Jul. 26, 2001.

BACKGROUND OF THE INVENTION

1. Field of the Invention

This application claims priority to U.S. patent application Ser. No. 09/927,131, filed on Aug. 10, 2001, and entitled "System and Method for Executing Wireless Communications Device Dynamic Instruction Sets;" and is related to U.S. patent application Ser. No. 09/916,900, filed on Jul. 26, 2001 and entitled "System and Method for Field Downloading a Wireless Communications Device Software Code Section," and Ser. No. 09/916,460, filed on Jul. 26, 2001, and entitled "System and Method for Compacting Field Upgradeable Wireless Communication Device Software Code Sections," all of which are incorporated herein by reference.

This invention generally relates to wireless communications devices and, more particularly, to a system and method for using dynamic instructions sets to diagnose wireless communications devices in the field.

2. Description of the Related Art

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

The wireless devices are used in a number of environments, with different subscriber services, for a number of different customer applications. Therefore, even if the software of a wireless device can be upgraded to improve service, it is unlikely that the upgrade will provide a uniform improvement for all users.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device system software could be differentiated into code sections, so that only specific code sections of system software would need to be replaced, in updating the system software. It would be advantageous if these code sections could be communicated to the wireless device via the airlink.

It would be advantageous if the wireless device could be operated with dynamically loaded instruction sets that would aid in the field updating of system software.

It would be advantageous if the dynamic instruction sets could tailor the modification to suit the needs or problems of individual device users.

It would be advantageous if these dynamic instruction sets could be used to troubleshoot and provide temporary fixes to problems in the system software.

SUMMARY OF THE INVENTION

Wireless communications device software updates give customers the best possible product and user experience. An expensive component of the business involves the recall of handsets to update the software. These updates may be necessary to offer the user additional services or to address problems discovered in the use of the phone after it has been manufactured. The present invention makes it possible to practically upgrade handset software in the field, via the airlink interface. More specifically, the present invention permits the wireless communication device to execute dynamic instruction sets. These dynamic instruction sets permit the wireless device to "intelligently", or conditionally upgrade the system software and system data. Further, the dynamic instruction sets permit the wireless device to collect data and make changes to the system software in response to the collected data. Alternately, the data can be collected and transmitted to the wireless device manufacturer for analysis.

Accordingly, a method is provided for field diagnosing system software in a wireless communications device. The method comprises: executing system software; launching a run-time engine; receiving patch manager run time instructions (PMRTI), including dynamic instruction sets and new code sections, in a file system section nonvolatile memory; and, processing dynamic instruction sets to field diagnose the system software.

Processing the dynamic instruction sets includes: executing the diagnosis instruction sets with the system software to collect data; analyzing the collected data; and, in response to analyzing the collected data, operating on system data and system software. The method further comprises: following the operating on the system software and system data, executing the system software.

Details of the above-described system software field diagnosis method, and a system for field diagnosing system software in a wireless communications device are provided below.

BRIEF DESCRIPTION OF THE DRAWING

FIG. 5 is a table representing the code section address table of FIG. 3.

FIG. 6 is a detailed depiction of symbol library one of FIG. 3, with symbols.

FIG. 7 is a table representing the symbol offset address table of FIG. 3.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
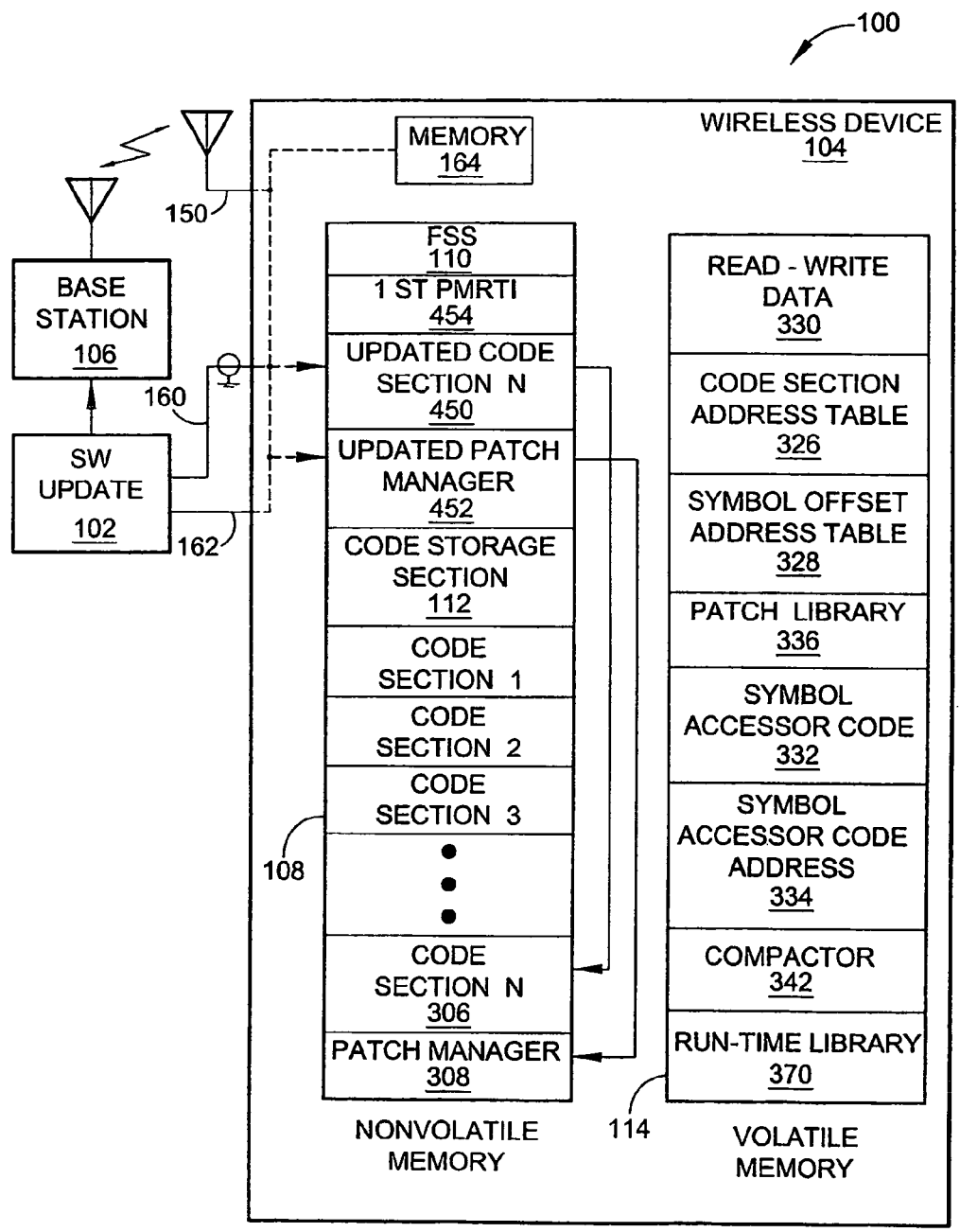
FIG. 1 is a schematic block diagram of the overall wireless device software maintenance system.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates and patch manager run time instructions (PMRTI), that are more generally known as instruction sets or dynamic instruction sets, are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most, two symbol libraries. The rest of the code base, the other symbol libraries, remains unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device over-writes a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a nonvolatile read-write driver symbol library that is also loaded into random access volatile read-write memory 114. The non-volatile read-write driver symbol library causes code sections to be overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
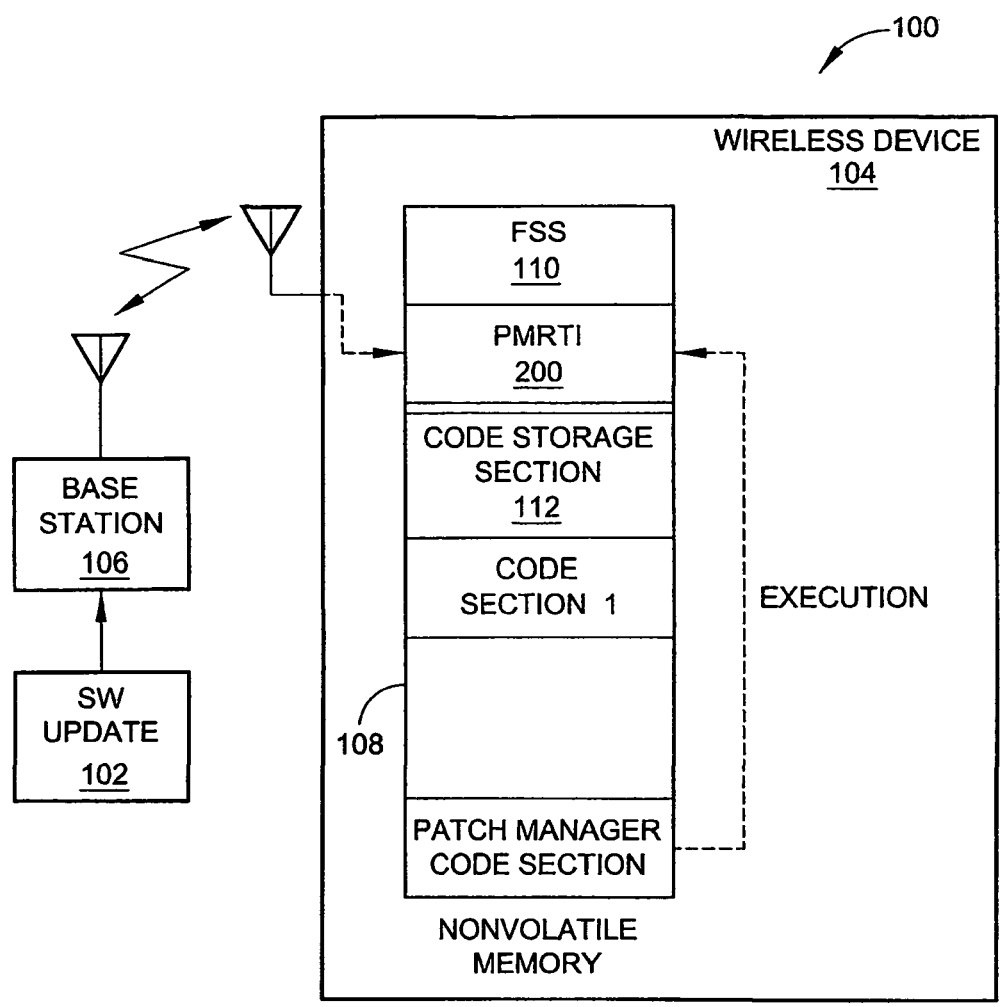
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install dynamic instructions sets, programs, or patch manager instruction sets (PMIS), referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110. Alternately, the PMRTI is maintained for future operations. For example, the PMRTI may be executed every time the wireless device is energized.

PMRTI is a very powerful runtime instruction engine. The handset can execute any instruction delivered to it through the PMRTI environment. This mechanism may be used to support RF calibrations. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
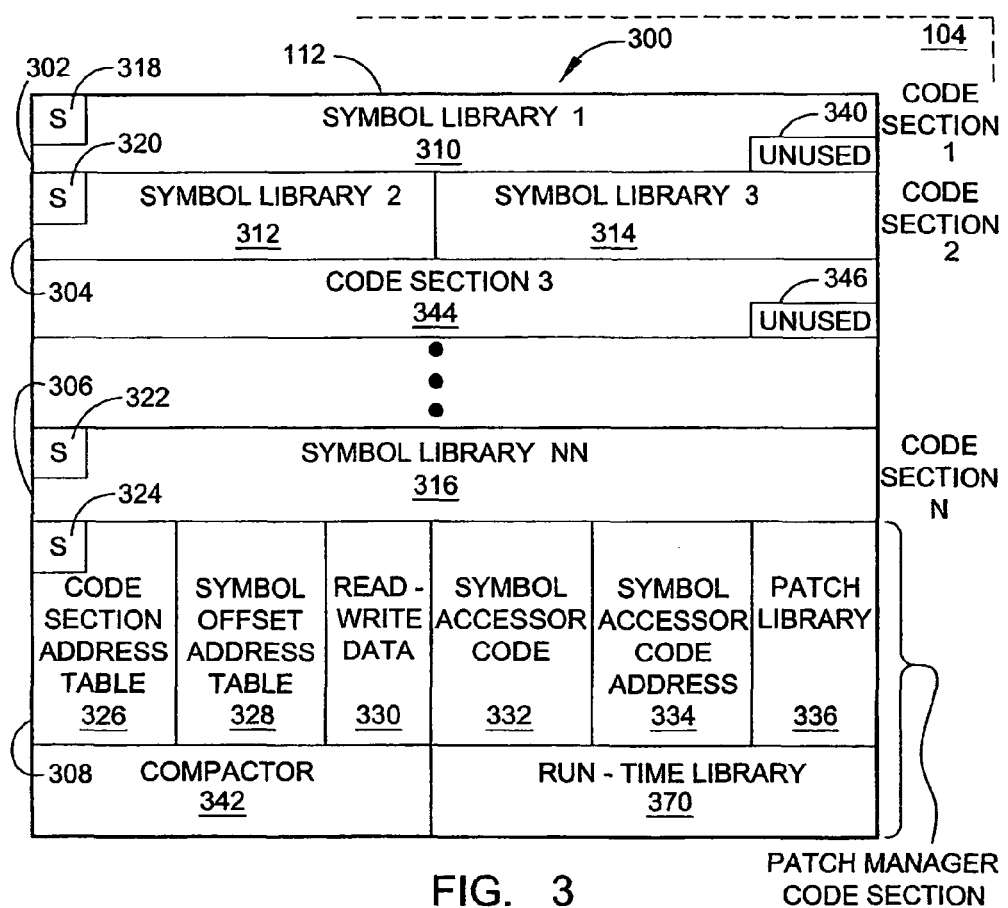
FIG. 3 is a schematic block diagram illustrating the present invention system for executing dynamic instruction sets in a wireless communications device.

FIG. 3 is a schematic block diagram illustrating the present invention dynamic instruction set execution in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the invention is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
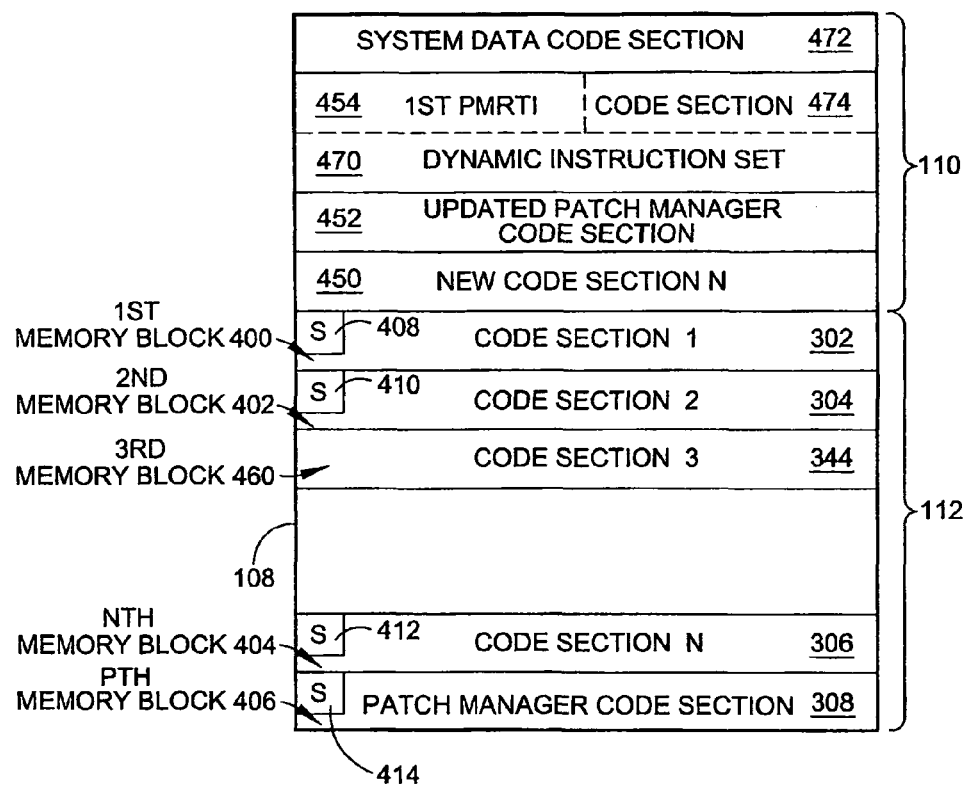
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system 300 further comprises a code section address table 326 as a type of symbol included in a symbol library arranged in the patch manager code section 308. The code section address table cross-references code section identifiers with corresponding code section start addresses in memory.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library three (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "X" symbol.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to locate the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section two (304), for example. However, as shown, the symbol accessor code 332 is arranged and stored at an address in the patch manager code section 308. The system 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) "X_1", corresponding to the "X" symbol (see FIG. 7). The symbol accessor code consults the symbol offset address table to determine that the "X_1" symbol identifier has an offset of (03) from the start of code section one (see FIG. 6). The symbol accessor code is invoked to seek the code section identifier "CS_1", corresponding to code section one. The symbol accessor code consults the code section address table to determine the start address associated with code section identifier (code section ID) "CS_1". In this manner, the symbol accessor code determines that the symbol identifier "X_1" is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager code section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Contiguously addressed memory blocks refers to partitioning the physical memory space into logical blocks of variable size. Code sections and memory blocks are terms that are essentially interchangeable when the code section is stored in memory. The concept of a code section is used to identify a section of code that is perhaps larger than the symbol library, or the collection of symbol libraries in the code section as it is moved and manipulated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 110 of memory 108 receives new code sections, such as new code section 450 and updated patch manager code section 452. The file system section also receives a first patch manager run time instruction (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 110 receives an updated symbol accessor code address, the patch manager replaces the symbol accessor code address in the first location in memory with updated symbol accessor code address. As noted above, the first location in memory 334 is typically in the patch manager code section (see FIG. 3).

As seen in FIG. 3, the patch library 308 is also includes a compactor, or a compactor symbol library 342. The compactor 342 can also be enabled as a distinct and independent code section, however as noted above, it is useful and efficient to bundle the functions associated with system software upgrades into a single patch manager code section. Generally, the compactor 342 can be said to resize code sections, so that new sections can be arranged with current code sections in the code storage section 112.

With the organization, downloading, and compaction aspects of the invention now established, the following discussion will center on the wireless communications device dynamic instruction set execution system 300. The system 300 comprises executable system software and system data differentiated into code sections, as discussed in great detail, above. Further, the system 300 comprises dynamic instruction sets for operating on the system data and the system software, and controlling the execution of the system software. As seen in FIG. 4, a dynamic instruction set 470 is organized into the first PMRTI 454. As seen in FIG. 3, the system also comprises a run-time engine for processing the dynamic instruction sets, enabled as run-time library 370. As with the compactor library 342 and patch library 336 mentioned above, the run-time library 370 is typically located in the patch manager code section 308. However, the run-time library 370 could alternately be located in another code section, for example the first code section 304.

The dynamic instruction sets are a single, or multiple sets of instructions that include conditional operation code, and generally include data items. The run-time engine reads the operation code and determines what operations need to be performed. Operation code can be conditional, mathematical, procedural, or logical. The run-time engine, or run-time library 370 processes the dynamic instruction sets to perform operations such as mathematical or logical operations. That is, the run-time engine reads the dynamic instruction set 470 and performs a sequence of operations in response to the operation code. Although the dynamic instruction sets are not limited to any particular language, the operation code is typically a form of machine code, as the wireless device memory is limited and execution speed is important. The operation code is considered conditional in that it analyzes a data item and makes a decision as a result of the analysis. The run-time engine may also determine that an operation be performed on data before it is analyzed.

For example, the operation code may specify that a data item from a wireless device memory be compared to a predetermined value. If the data item is less than the predetermined value, the data item is left alone, and if the data item is greater than the predetermined value, it is replaced with the predetermined value. Alternately, the operation code may add a second predetermined value to a data item from the wireless device memory, before the above-mentioned comparison operation is performed.

As mentioned above, the file system section nonvolatile memory 110 receives the dynamic instruction sets through an interface such as the airlink 150. As shown in FIG. 1, the interface can also be radio frequency (RF) hardline 160. Then, the PMRTI can be received by the FSS 110 without the system software being operational, such as in a factory calibration environment. The PMRTI can also be received via a logic port interface 162 or an installable memory module 164. The memory module 164 can be installed in the wireless device 104 at initial calibration, installed in the field, or installed during factory recalibration. Although not specially shown, the PMRTI can be received via an infrared or Bluetooth interfaces.

Figure 8A:
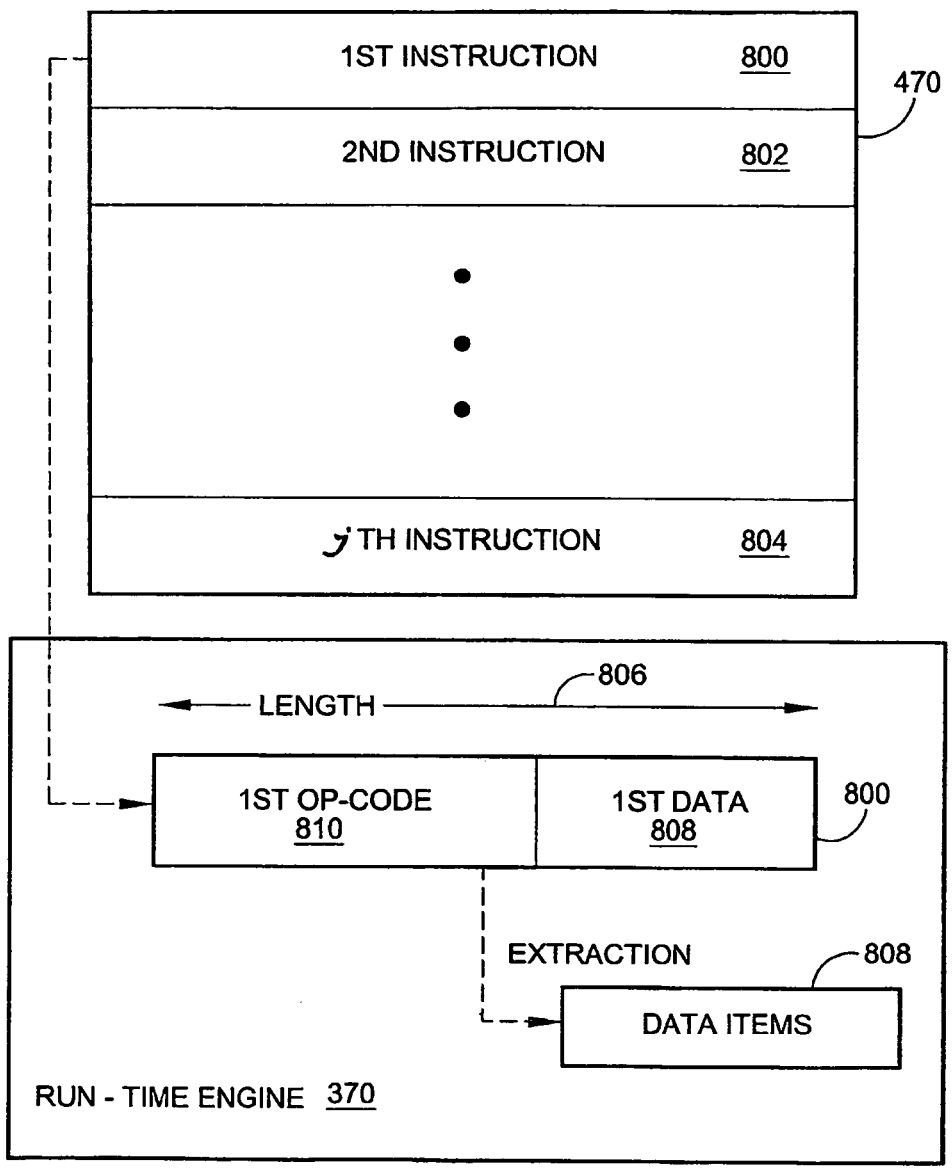
FIGS. 8a and 8b are depictions of the operation code (opcode) being accessed by the run-time engine.
Figure 8B:
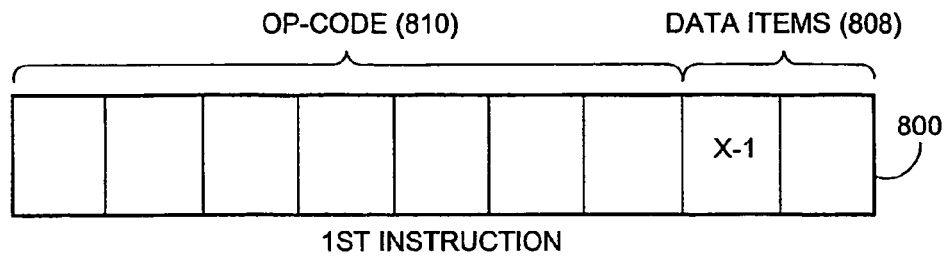

FIGS. 8a and 8b are depictions of instructions being accessed by the run-time engine 370. Shown in FIG. 8a is a first instruction 800, a second instruction 802, and a jth instruction 804, however, the dynamic instruction set is not limited to any particular number of instructions. The length of the operation code in each instruction is fixed. The run-time engine 370 captures the length of the instruction, as a measure of bytes or bits, determine if the instruction includes data items. The remaining length of the instruction, after the operation code is subtracted, includes the data items. The run-time engine extracts the data items from the instruction.

As shown, the length 806 of the first instruction 800 is measured and data items 808 are extracted. Note that not all instructions necessary include data items to be extracted. The run-time engine 370 uses the extracted data 808 in performing the sequence of operations responsive to the operation code 810 in instruction 800.

FIG. 8b is a more detailed depiction of the first instruction 800 of FIG. 8a. Using the first instruction 800 as an example, the instruction includes operation code 810 and data 808. The instruction, and more specifically, the data item section 808 includes symbol identifiers, which act as a link to symbols in the wireless device code sections. As explained in detail above, the symbol identifiers are used with the code section address table 326 (see FIG. 5) and the symbol offset address table 328 (see FIG. 7) to locate the symbol corresponding to the symbol identifier. As shown, a symbol identifier "X__1" is shown in the first instruction 800. The symbol offset address table 328 locates the corresponding symbol in a code section with the "CS__1" identifier and an offset of "3". The code section address table 326 gives the start address of code section one (302). In this manner, the symbol "X" is found (see FIG. 6).

After the run-time engine locates symbols corresponding to the received symbol identifiers using the code section address table and symbol offset address table, it extracts data when the located symbols are data items. For example, if the symbol "X" is a data item in symbol library one (310), the run-time engine extracts it. Alternately, the "X" symbol can be operation code, and the run-time engine executes the symbol "X" when it is located.

PMRTI can be used to update system data, or system data items. In some aspects of the invention system data is stored in a code section in the file system section 110, code section 472 for example, see FIG. 4. The run-time engine accesses system data from code section 472 and analyzes the system data. The run-time engine processes the operation code of the dynamic instruction sets to perform mathematical or logical operation on data items, as described above. After the operation, the run-time engine processes the instructions to create updated system data. Note that the updated system data may include unchanged data items in some circumstances. The system data in the second code section 472 is replaced with the updated system data in response to the operation code. Thus, by the processing of instruction by the run-time engine, the system software is controlled to execute using the updated system data in code section 472. In this manner, specifically targeted symbols in the system software can be updated, without replacing entire code sections. By the same process, the system data can be replaced in a code section in the code storage section 112. For example, the system data can be stored in the third code section 344, and the run-time engine can replace the system data in the third code section with updated system data in response to the operation code.

PMRTI can also be used to update data items in volatile memory 114. As an example, the volatile memory 114 accept read-write data 330, see FIG. 1. The read-write data can be from one, or from a plurality of code sections in the code storage section 112 and/or the FSS 110. The run-time engine accesses the read-write data, analyzes the read-write data 330, creates updated read-write data, and replaces the read-write data 330 in the volatile memory 114 with the updated read-write data in response to the operation code. Then, the system software is controlled to execute using the updated read-write data in volatile memory 114.

In some aspects of the invention, the run-time engine monitors the execution of the system software. Performance monitoring is broadly defined to include a great number of wireless device activities. For example, data such as channel parameters, channel characteristics, system stack, error conditions, or a record of data items in RAM through a sequence of operations leading to a specific failure condition or reduced performance condition can be collected. It is also possible to use dynamic instructions sets to analyze collected performance data, provide updated data variants, and recapture data to study possible solutions to the problem. Temporary fixes can also be provisioned using PMRTI processes.

More specifically, the run-time engine collects performance data, and stores the performance data in the file system section in response to the operation code. Then, the system software is controlled to execute by collecting the performance data for evaluation of the system software. Evaluation can occur as a form of analysis performed by dynamic instruction set operation code, or it can be performed outside the wireless device. In some aspects of the invention, the run-time engine accesses the performance data that has been collected from the file system section and transmits the performance data via an airlink interface in response to the operation code. Collecting performance data from wireless devices in the field permits a manufacturer to thoroughly analyze problems, either locally or globally, without recalling the devices.

In some aspects of the invention, file system section 110 receives a patch manager run time instruction including a new code section. For example, a new code section 474 is shown in FIG. 4. Alternately, the new code section can be independent of the PMRTI, such as new code section n (450). For example, the new code section n (450) may have been received in earlier airlink communications, or have been installed during factory calibration. The run-time engine adds the new code section 474 (450) to the code storage section in response to the operation code. In some aspects of the invention, the new code section is added to an unused block in the code storage section 112. Alternately, a compaction operation is required. Then, the system software is controlled to execute using the new code section 474 (450). In other aspects of the invention, the PMRTI 454 includes an updated code section 474. Alternately, the new code section 450 is an updated code section independent of the PMRTI. The run-time engine replaces a code section in the code storage section, code section two (304) for an example, with the updated code section 474 (450) in response to the operation code. The system software is controlled to execute using the updated code section 474 (456). In some aspects of the invention a compaction operation is required to accommodate the updated code section. Alternately, the updated code section is added to an unused or vacant section of the code storage section.

As explained above, the addition of a new code section or the updating of a code section typically requires the generation of a new code section address table, as these operation involve either new and/or changed code section start addresses. Further, a compaction operation also requires a new code section address table. The compaction operations may be a result of the operation of the compactor 342, explained above, or the result of PMRTI instructions that supply details as to how the compaction is to occur. When the PMRTI includes downloading and compaction instructions, the PMRTI typically also includes a new code section address table that becomes valid after the downloading and compaction operations have been completed.

Figure 9:
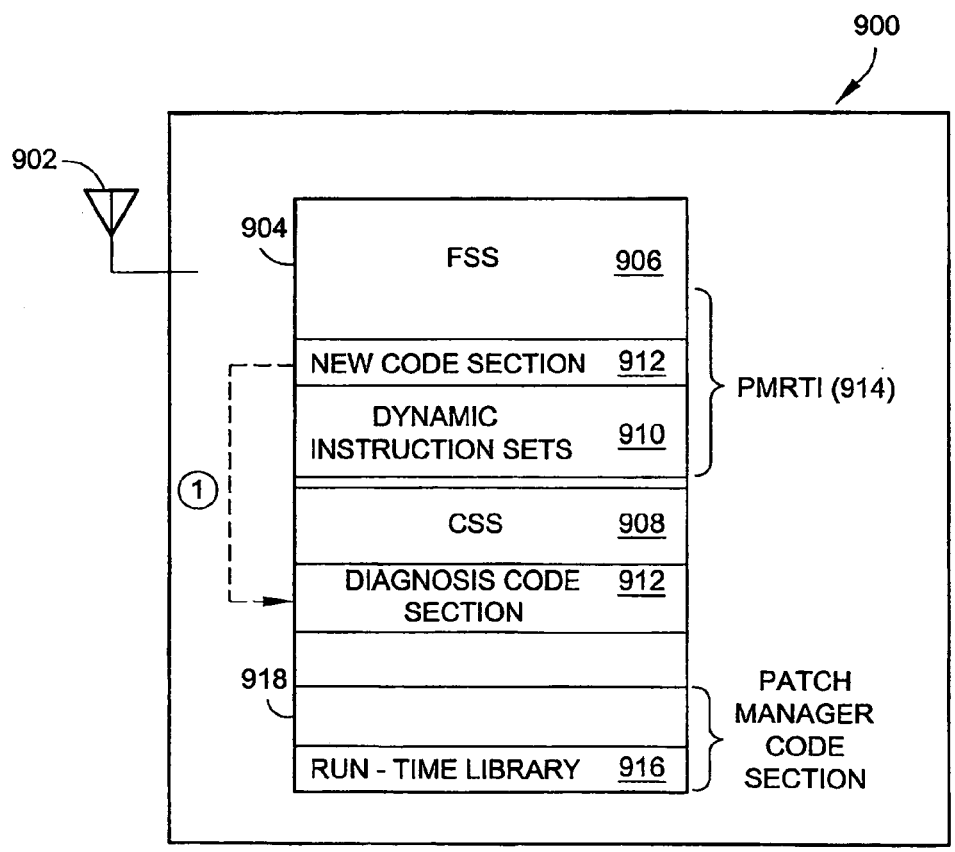
FIG. 9 is a schematic block diagram illustrating the present invention system for field diagnosing system software in a wireless communications device.

FIG. 9 is a schematic block diagram illustrating the present invention system for field diagnosing system software in a wireless communications device. The system 900 comprises an airlink interface 902, equivalent the airlink interface 150 of FIG. 1, and executable system software and system data differentiated into code sections stored in nonvolatile memory permanent storage 904, equivalent to memory 108 of FIG. 1. System 900 is substantially the same as system 100 described above, and the similar features will not be repeated in the interest of brevity. The nonvolatile permanent storage 904 includes a file system section 906 and code storage section 908.

Dynamic instruction sets 910 for field diagnosing system software are received via the airlink interface 902. The dynamic instruction sets 910, as well as new code sections 912, are part of patch manager run time instructions 914. Typically, the dynamic instruction sets 910 are stored in the file system section 906. A run-time engine, or run-time library 916 processes the dynamic instruction sets 910. As mentioned above, the run-time library 916 is typically part of the patch manager code section 918.

The executable system software and system data (code sections in permanent memory 904) are operated on by the dynamic instruction sets 910. The system software is executed following the operations on the system software and system data by the dynamic instruction sets 910.

As mentioned in detail above, the system software is formed into symbol libraries. Each symbol library comprises symbols having related functionality that are arranged into code sections in a code storage section nonvolatile memory 908. The file system section 906 of nonvolatile memory receives patch manager run time instructions (PMRTI) 914, including dynamic instruction sets 910 and new code sections (new code section 912 is shown).

In some aspects of the invention the dynamic instruction set 910 is a diagnosis instruction set, and the new code section 912 is a diagnosis code section. After being received in the file system section 906, the diagnosis code section 912 is stored in nonvolatile memory 904, typically in the code storage section 908 (see the dotted arrow labeled "1"). The diagnosis instruction set 910 executes the diagnosis code section 912 with the system software.

Figure 10:
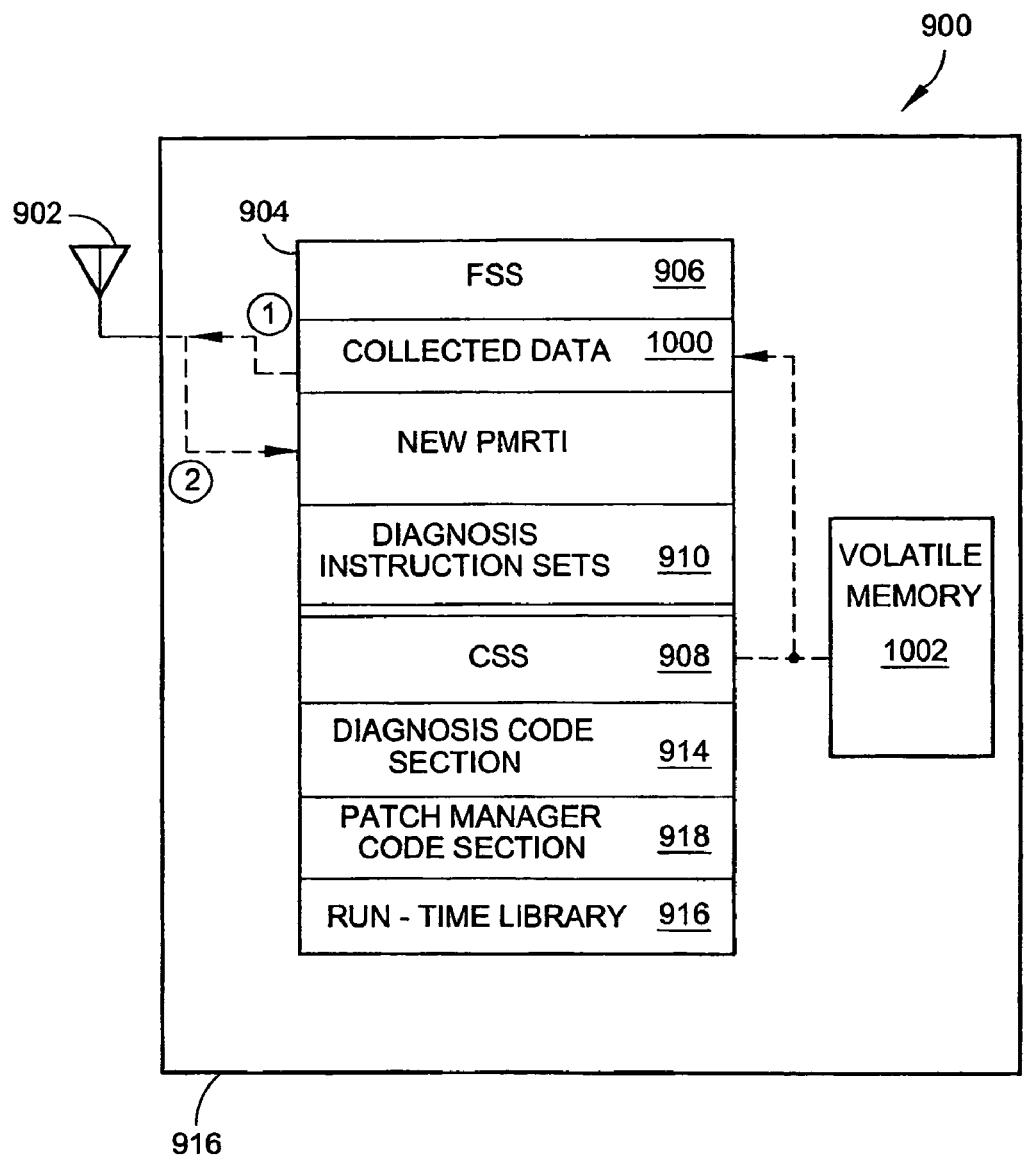
FIG. 10 is a schematic block diagram illustrating the system of FIG. 9 in greater detail.

FIG. 10 is a schematic block diagram illustrating the system of FIG. 9 in greater detail. One function of the diagnosis instruction sets 910 is to collect system data in response to executing the diagnosis code section 912 with the system software. In one aspect of the invention important system software symbols and symbol data are collected in a collected data code section 1000, which is typically in the file system section 906 (as shown), but can also be in the code storage section (not shown) or in a read-write volatile memory 1002.

In another aspect of the invention the system software stores symbols and data items, and updates the stored symbols and data items to provide a record of the system software operation. This temporary status information can be kept in the volatile memory 1002. This permits the diagnosis instruction sets 910 to more simply collect the addresses and values of symbols stored in read-write volatile memory for storage in the collected data code section 1000.

The collected data in collected data code section 1000 can then be analyzed by the field diagnosis system 900 to enact a temporary fix, see the explanation of FIGS. 13 and 14 below, or it can be transmitted to the wireless device manufacturer for analysis. The diagnosis instruction sets 910 cause the collected system data 1000 to be transmitted by the airlink interface 902, see the dotted arrow labeled "1". Then, a new patch manager run time instruction 1004 is received via the airlink interface 902, see the dotted arrow labeled "2". The new PMRTI 1004 has a new code section including updated data. The diagnostic instruction sets 910 replace a first code section in permanent storage with the new code section (see FIG. 9), and the system software is executed using the new code section.

Figure 11:
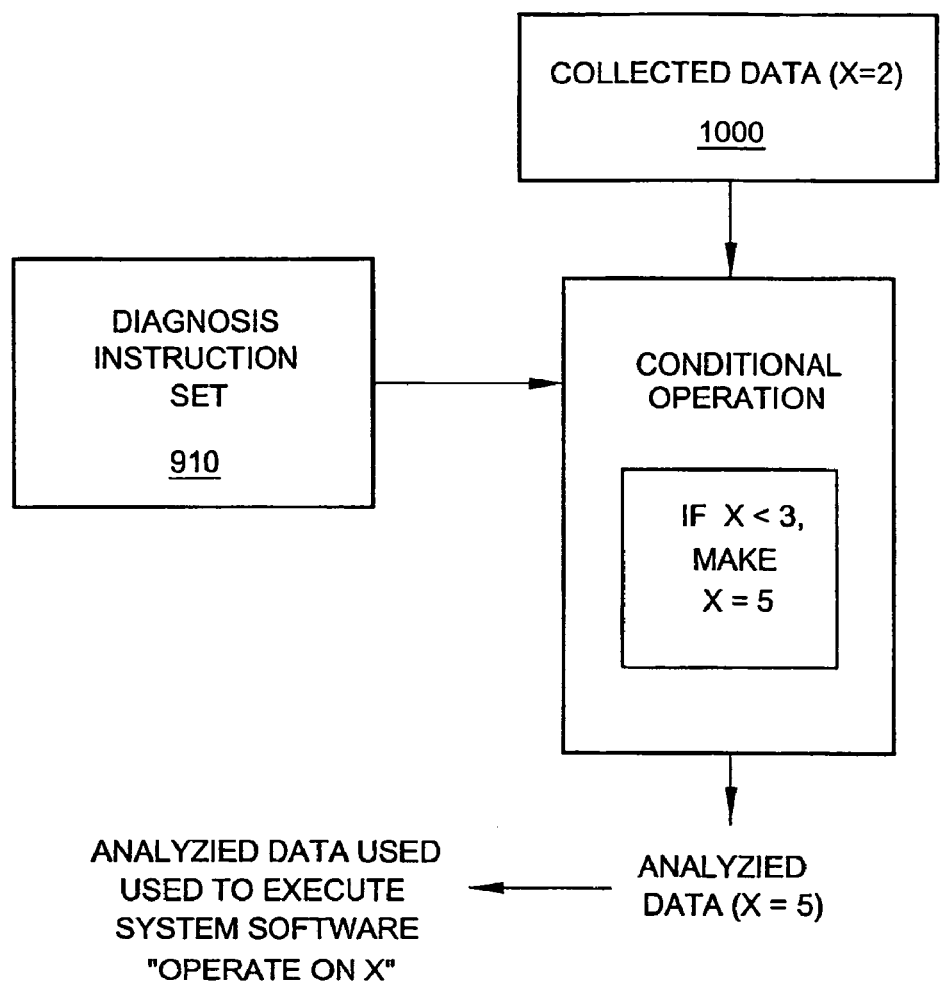
FIG. 11 is a schematic diagram illustrating the conditional logic or mathematical aspect of the diagnosis instruction sets of FIG. 10.

FIG. 11 is a schematic diagram illustrating the conditional logic or mathematical aspect of the diagnosis instruction sets 912 of FIG. 10. In this aspect of the invention the diagnosis instruction sets 912 use conditional diagnosis instruction sets to analyze the collected data. The condition operation can be a simple mathematical operation, such as add "3" to the data item. Alternately, the operation could be more complex. As shown, the operation is: if X<3, make X=5, else leave the X value undisturbed. Since the conditional operations are based upon standard software functions, the total number, types, and variations of conditional logic operations are too numerous to mention. The system data is updated in response to analyzing the collected data, and the system software is executed using the updated system data. As shown, the system software operates on X, where the value of X equals 5.

Figure 12:
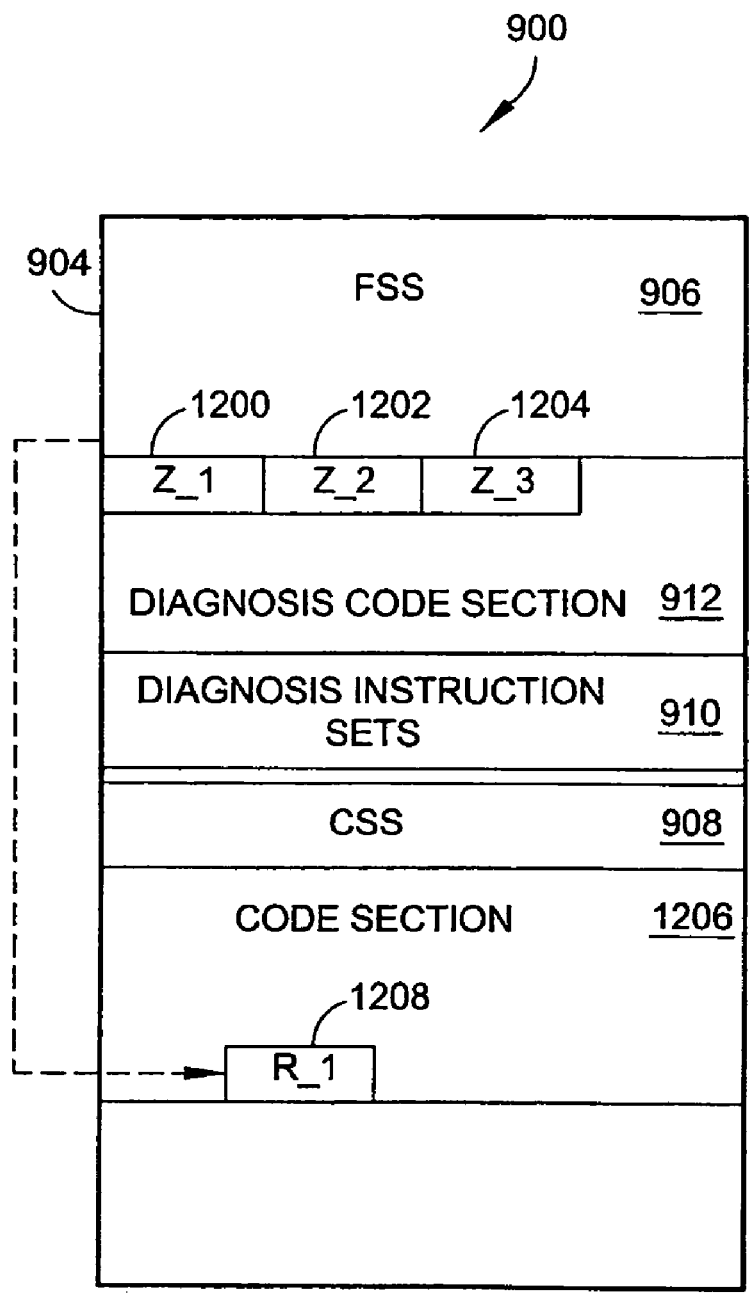
FIG. 12 is a schematic block diagram illustrating the simple updating aspect of the present invention field diagnosis system.

FIG. 12 is a schematic block diagram illustrating the simple updating aspect of the present invention field diagnosis system 900. The diagnosis code section 914 includes predetermined sets of updated system data, shown as Z_1 (1200), Z_2 (1202), and Z_3 (1204). The diagnosis dynamic instruction sets 912 select an updated system data set, Z_1 (1200) for example. Then, the system software, code section 1206 for example, executes using the selected updated system data set Z_1 (1200). Note that the Z_1 data set 1200 replaces the R_1 data set 1208. The diagnosis instruction sets 912 have already determined that system software is less efficient using the R_1 data set.

Figure 13:
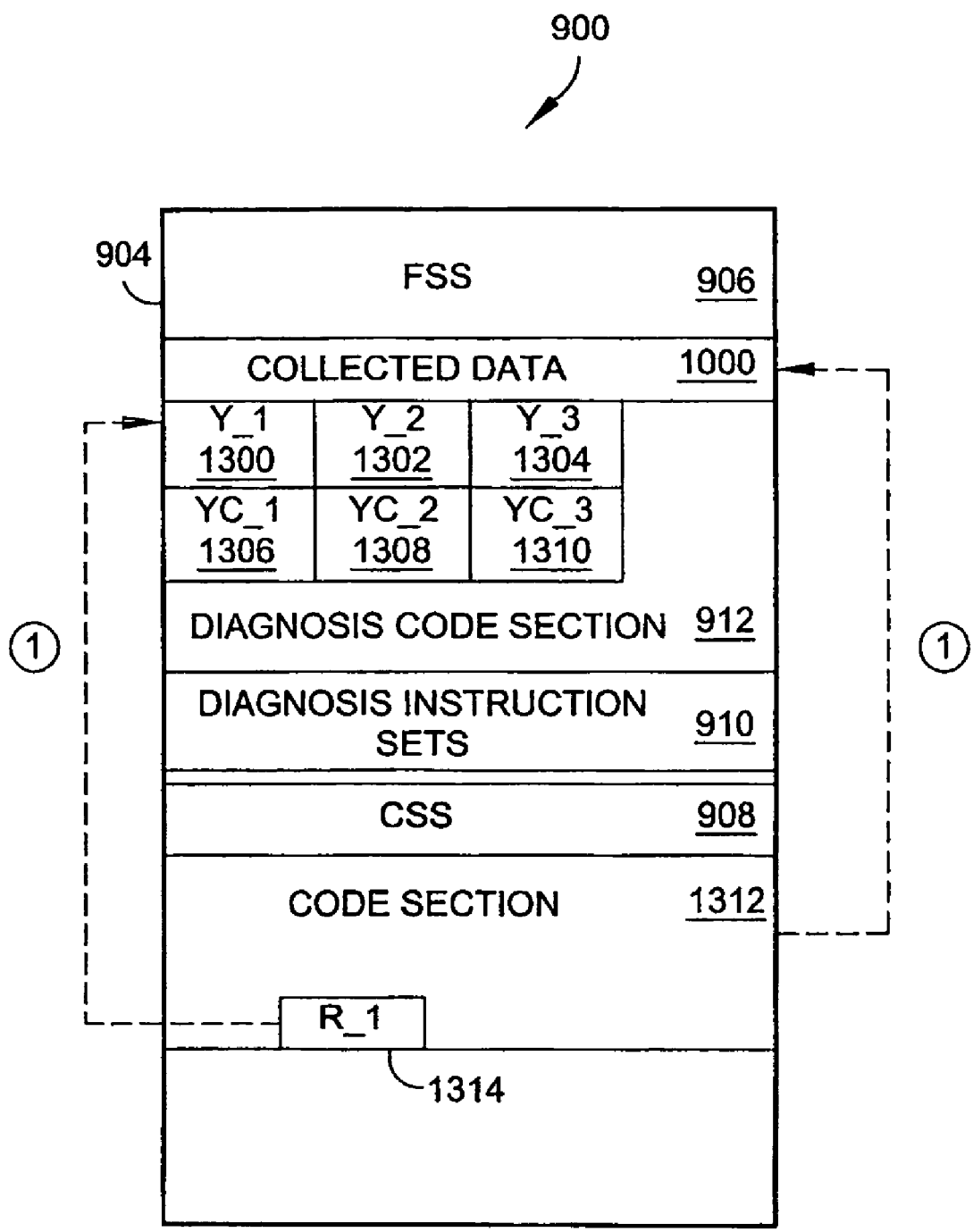
FIG. 13 is a schematic block diagram illustrating the iterative code patching aspect of the present invention field diagnosis system.

FIG. 13 is a schematic block diagram illustrating the iterative code patching aspect of the present invention field diagnosis system 900. Here, the diagnosis code section 914 includes a plurality of temporary code symbol libraries, shown as Y_1 (1300), Y_2 (1302), and Y_3 (1304) and corresponding constraints YC_1 (1306), YC_2 (1308), and YC_3 (1310). This diagnosis code section 914 can also be called a test code section. Although the libraries and constraint sections are shown as separate, the constraint sections 1306-1310 can alternately be a part of the temporary libraries 1300-1304, or be located in other diagnosis code sections (not shown).

The diagnosis instruction sets 912 execute a first temporary code, Y_1 (1300) for example. That is, the diagnosis instruction sets 912 cause the system software, code section 1312 for example, to execute using the first temporary code Y_1 (1300). System data is collected in response to executing the first temporary code Y_1 (1200), in collected data code section 1000 for example (see the dotted arrow labeled "1"). The diagnosis instruction sets 912 compare collected system data to the corresponding constraints YC_1 (1306). The analysis can be based upon simple or complex conditional logic or mathematic operations, as mentioned above, that are generated by diagnosis instruction sets. Simplistically, the diagnosis code section 914 includes constraints organized as system data trigger values, and the diagnosis instruction sets 912 analyze the collected data by comparing system data 1000, collected in response to executing the first temporary code Y_1 (1300), to the system data trigger values in YC_1 (1306).

If the collected system data 1000 passes analysis, then the first temporary code Y_1 (1200) is assumed to be operational and the system data is temporarily updated per the first temporary code constraints YC_1 (1306). Since the code section 1312 is to be operated with a temporary code section instead of the installed code, R_1 (1314) for example, the system software temporarily redirects selected system software symbols to counterpart symbols in the first temporary code symbol library Y_1 (1300) of the diagnosis code section 914, see the dotted arrow labeled "2". As explained in detail above, the code section address tables and symbol offset address tables are used to locate code sections and symbols within code sections. When a temporary code section is patched into the system software, the diagnosis instruction sets 912 also update the symbol offset address table and code section address table with addresses in the diagnosis code section. As shown, the code section 1312 would be updated with symbols in temporary code section Y_1 (1300) to replace counterpart symbols in code section R_1 (1314).

However, the collected data 1000 may not favorable compare with the constraints. This unfavorable comparison is an indication that the temporary code is not a successful fix for the system software problem. Then, the diagnosis instruction sets 912 execute alternate temporary code symbol libraries if the collected system data does not pass analysis. The process iteratively tests temporary code sections until a "good" code section is found. If no "good" code is found, the system software continues to operate with the originally installed code. Note that the above-mentioned temporary fix is intended to be a diagnosis tool, however, the temporary fix can be left patched into the system indefinitely.

Figure 14:
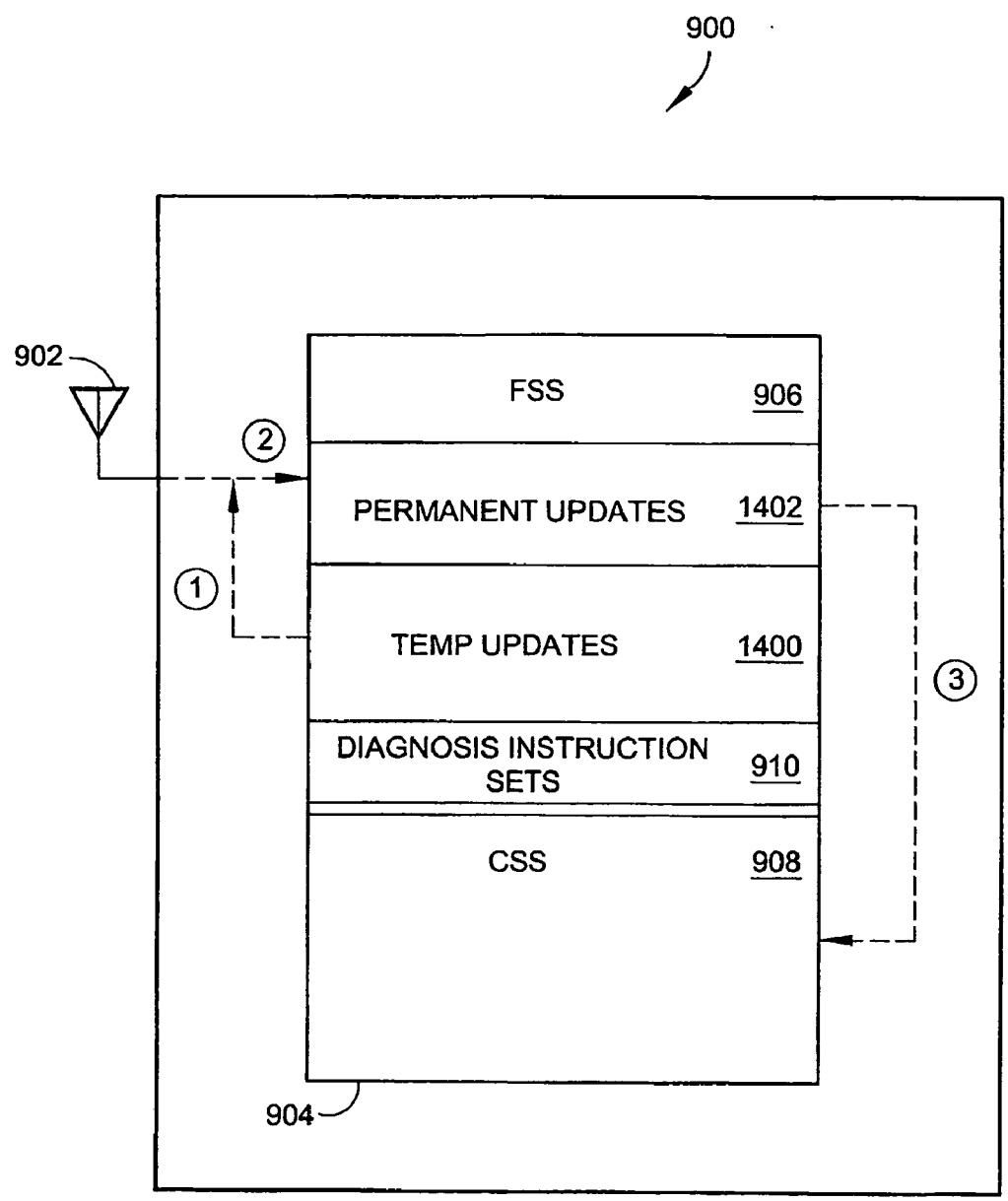
FIG. 14 is a schematic block diagram illustrating a permanent solution to the temporary fixes established by the field diagnosis system of FIG. 13.

FIG. 14 is a schematic block diagram illustrating a permanent solution to the temporary fixes established by the field diagnosis system 900 of FIG. 13. To enact a permanent solution to the diagnosed problem, the diagnosis instruction sets 912 cause the collection of temporary software data updates and temporarily redirected system software symbols to be transmitted via the airlink interface 902, see the dotted arrow labeled "1". As shown, the temporary update information is stored in code section 1400. The transmission of the temporary fixes permits the manufacturer to perform an analysis of the information so that a comprehensive and efficient solution can be generated. Then, a permanent updated code section 1402 with an updated code section address table and updated symbol offset address table is received as a new PMRTI in the file system section 906, via the airlink interface 902, see the dotted arrow labeled "2". The diagnosis instruction sets 912 store the updated code section 1402 with updated code section address table and symbol offset table in permanent storage. As shown, the updated code section is stored in the code storage section 908, see dotted arrow labeled "3".

Figure 15A:
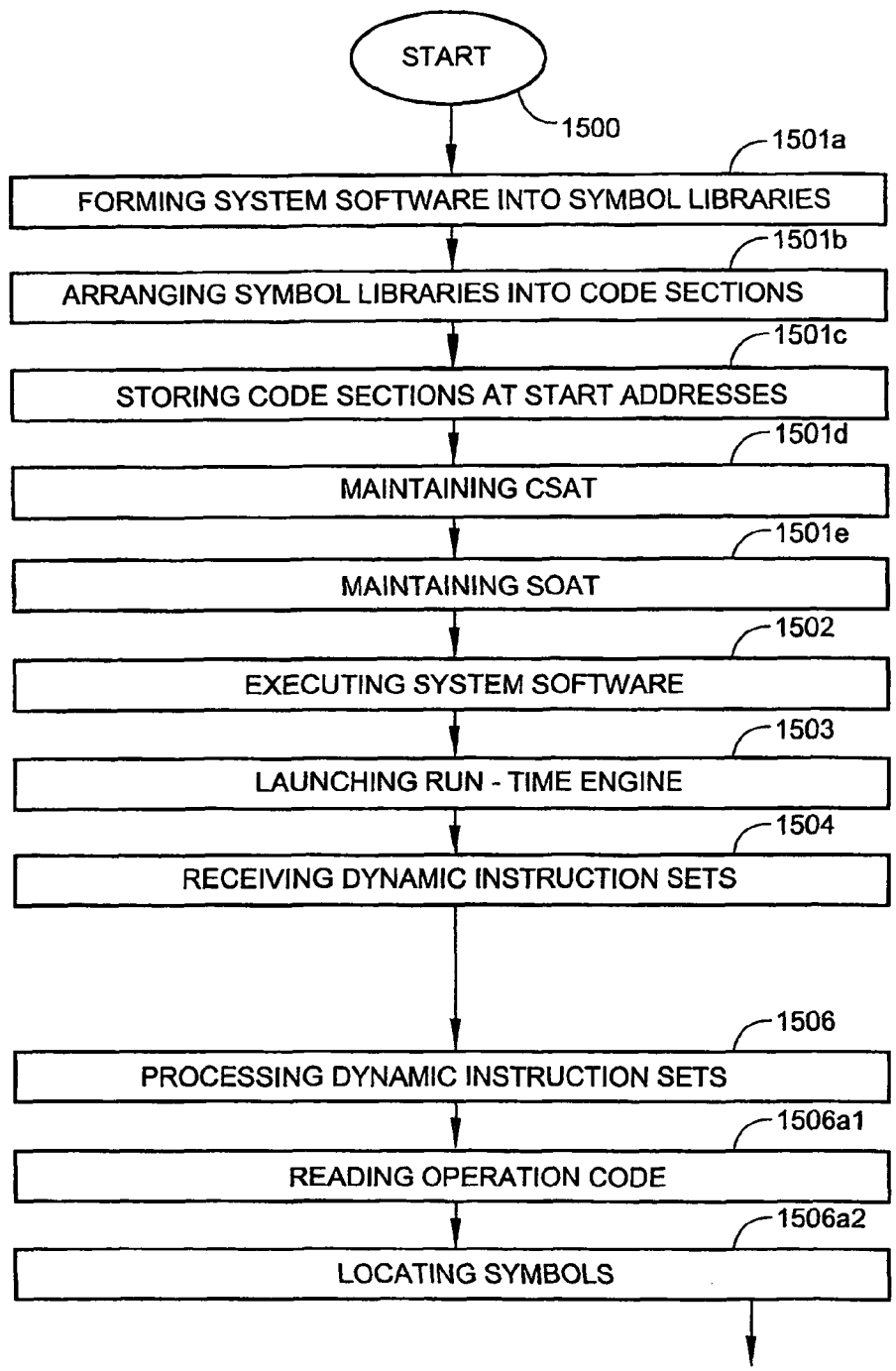
FIGS. 15a and 15b are flowcharts illustrating the present invention method for executing dynamic instruction sets in a wireless communications device.
Figure 15B:
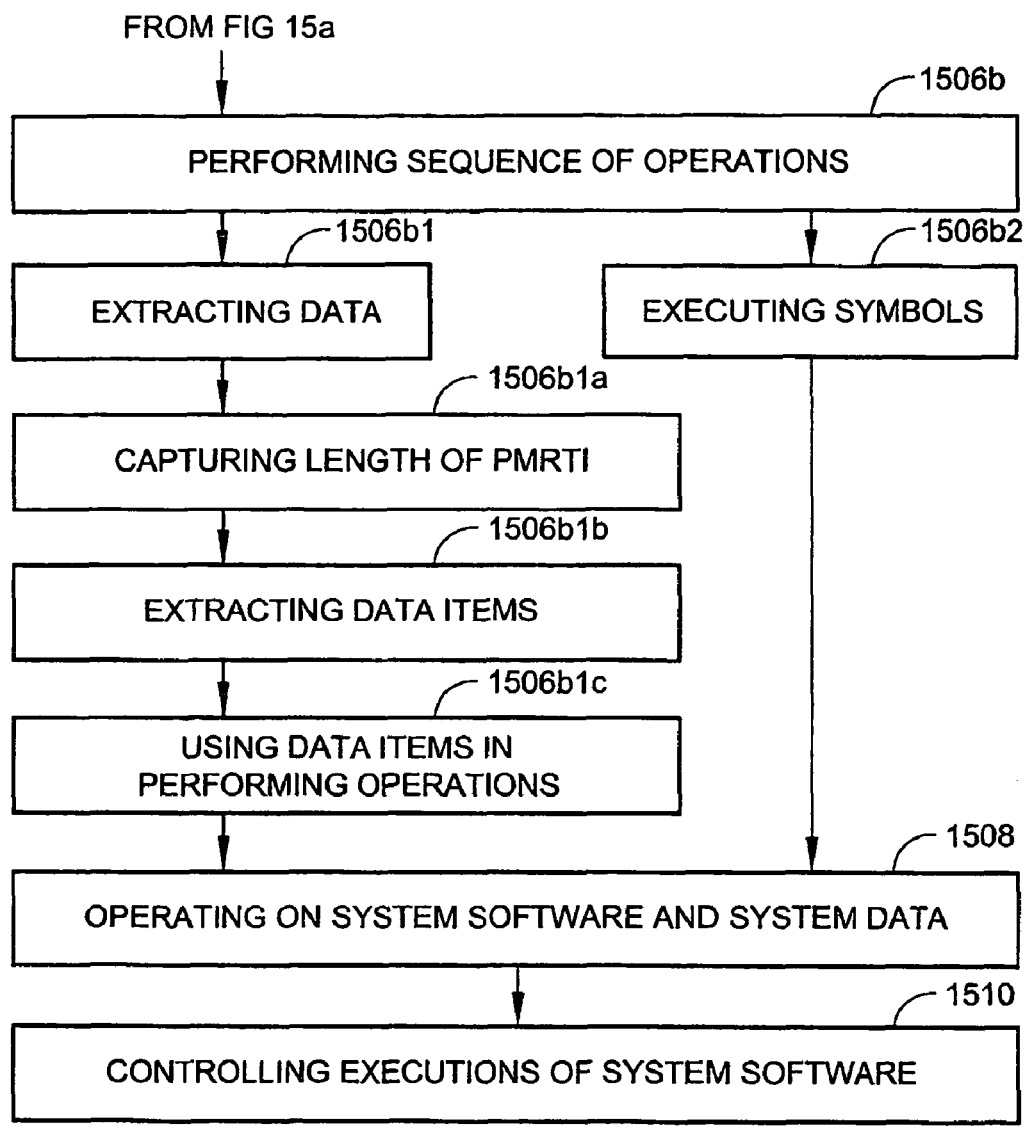

FIGS. 15*a* and 15*b* are flowcharts illustrating the present invention method for executing dynamic instruction sets in a wireless communications device. Although depicted as a sequence of numbered steps for clarity, no order should be inferred from the numbering (and the numbering in the methods presented below) unless explicitly stated. The method starts at Step 1500. Step 1501*a* forms the system software into symbol libraries, each symbol library comprising symbols having related functionality. Step 1501*b* arranges the symbol libraries into code sections. Step 1502 executes system software. Step 1503 launches a run-time engine. Typically, launching a run-time engine includes invoking a run-time library from a first code section. The run-time engine can be launched from either volatile or nonvolatile memory. Step 1504, following Step 1503, receives the dynamic instruction sets. Receiving the dynamic instruction sets in Step 1504 includes receiving the dynamic instruction sets through an interface selected from the group including airlink, radio frequency (RF) hardline, installable memory module, infrared, and logic port interfaces. In some aspects of the invention, receiving the dynamic instruction set in Step 1504 includes receiving a patch manager run time instruction (PMRTI) in a file system section nonvolatile memory.

Step 1506 processes dynamic instruction sets. Processing dynamic instruction sets includes processing instructions in response to mathematical and logical operations. In some aspects of the invention, Step 1507 (not shown), following the processing of the dynamic instruction sets, deletes dynamic instruction sets. Step 1508 operates on system data and system software. Step 1510, in response to operating on the system data and system software, controls the execution of the system software.

Typically, receiving the patch manager run time instructions in Step 1504 includes receiving conditional operation code and data items. Then, processing dynamic instruction sets in Step 1506 includes substeps. Step 1506*a*1 uses the run-time engine to read the patch manager run time instruction operation code. Step 1506*b* performs a sequence of operations in response to the operation code.

In some aspects, arranging the symbol libraries into code sections in Step 1501*b* includes starting symbol libraries at the start of code sections and arranging symbols to be offset from their respective code section start addresses. Then the method comprises further steps. Step 1501*c* stores the start of code sections at corresponding start addresses. Step 1501*d* maintains a code section address table (CSAT) cross-referencing code section identifiers with corresponding start addresses. Step 1501*e* maintains a symbol offset address table (SOAT) cross-referencing symbol identifiers with corresponding offset addresses, and corresponding code section identifiers.

In some aspects of the invention, receiving the patch manager run time instruction in Step 1504 includes receiving symbol identifiers. Then, the method comprises a further step. Step 1506*a*2 locates symbols corresponding to the received symbol identifiers by using the code section address table and symbol offset address table. Performing a sequence of operations in response to the operation code in Step 1506*b* includes substeps. Step 1506*b*1 extracts the data when the located symbols are data items. Step 1506*b*2 executes the symbols when the located symbols are instructions.

In some aspects of the invention, processing dynamic instruction sets in Step 1506*b*1 includes additional substeps. Step 1506*b*1*a* uses the run-time engine to capture the length of the patch manager run time instruction. Step 1506*b*1*b* extracts the data items from the patch manager run time instruction, in response to the operation code. Step 1506*b*1*c* uses the extracted data in performing the sequence of operations responsive to the operation code.

Figure 16:
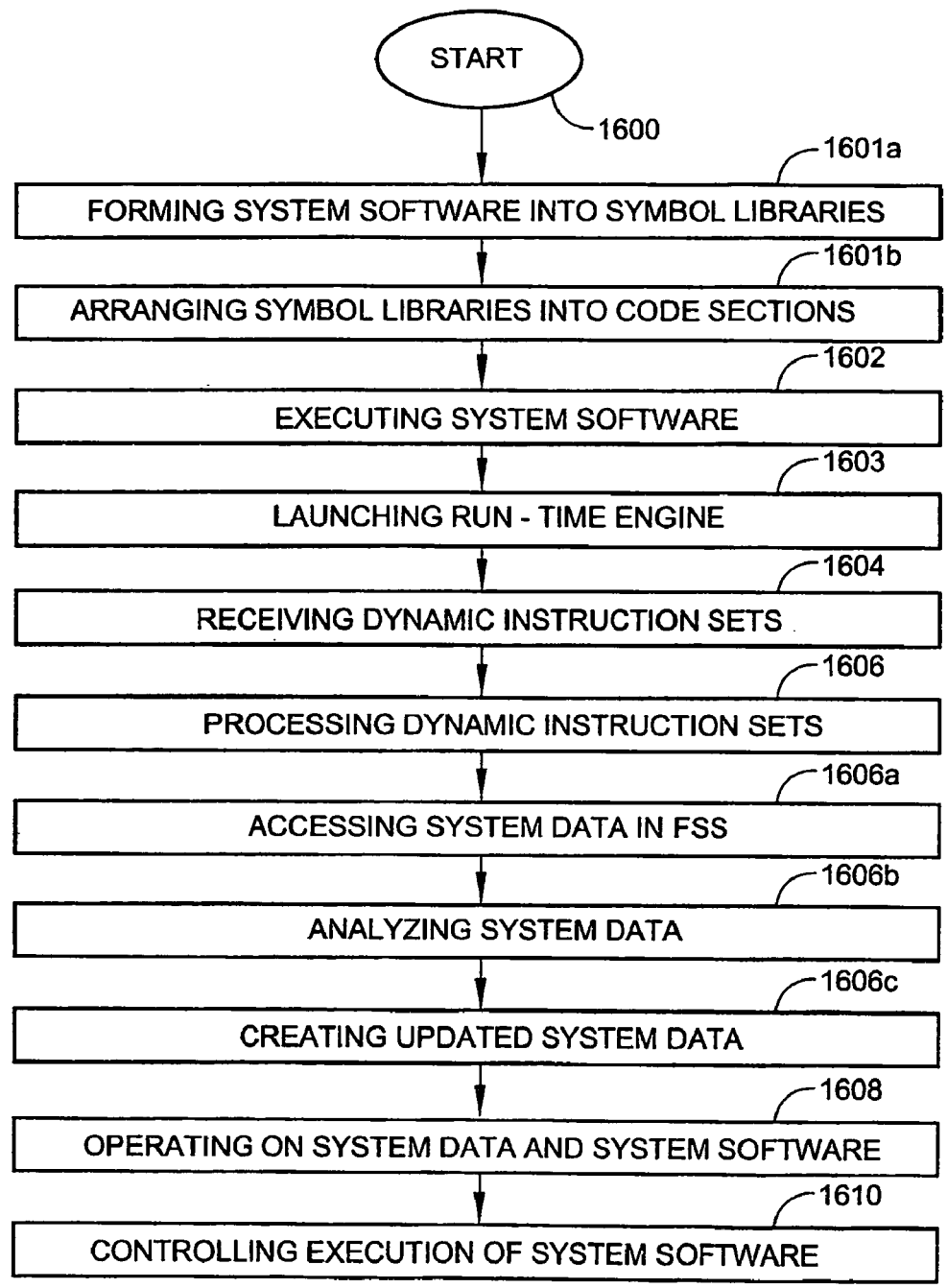
FIG. 16 is a flowchart illustrating an exemplary dynamic instruction set operation.

FIG. 16 is a flowchart illustrating an exemplary dynamic instruction set operation. Several of the Steps in FIG. 16 are the same as in FIG. 15, and are not repeated here in the interest of brevity. Processing dynamic instruction sets in Step 1606 includes substeps. Step 1606*a* accesses system data stored in a second code section in the file system section. Step 1606*b* analyzes the system data. Step 1606*c* creates updated system data. Then, operating on system data and system software in Step 1608 includes replacing the system data in the second section with the updated system data, and controlling the execution of the system software in Step 1610 includes using the updated system data in the execution of the system software.

Figure 17:
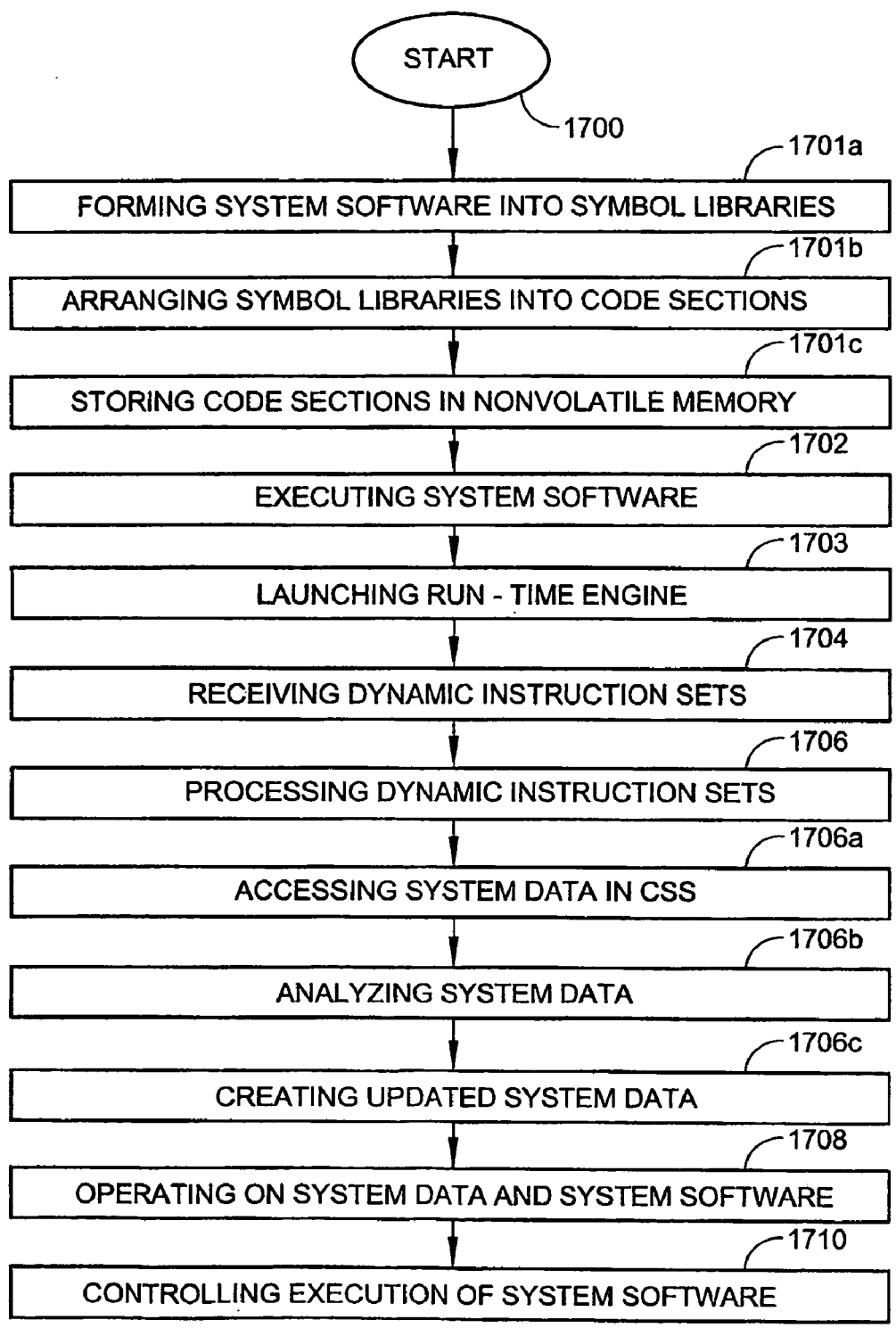
FIG. 17 is a flowchart illustrating another exemplary dynamic instruction set operation.

FIG. 17 is a flowchart illustrating another exemplary dynamic instruction set operation. Several of the Steps in FIG. 17 are the same as in FIG. 15, and are not repeated here in the interest of brevity. Step 1701*c* stores a plurality of code sections in a code storage section nonvolatile memory. Processing dynamic instruction sets in Step 1706 includes substeps. Step 1706*a* accesses system data stored in a third code section in the code storage section (CSS). Step 1706*b* analyzes the system data. Step 1706c creates updated system data. Operating on the system data and system software in Step 1708 includes replacing the system data in the third code section with the updated system data. Controlling the execution of the system software in Step 1710 includes using the updated system data in the execution of the system software.

Figure 18:
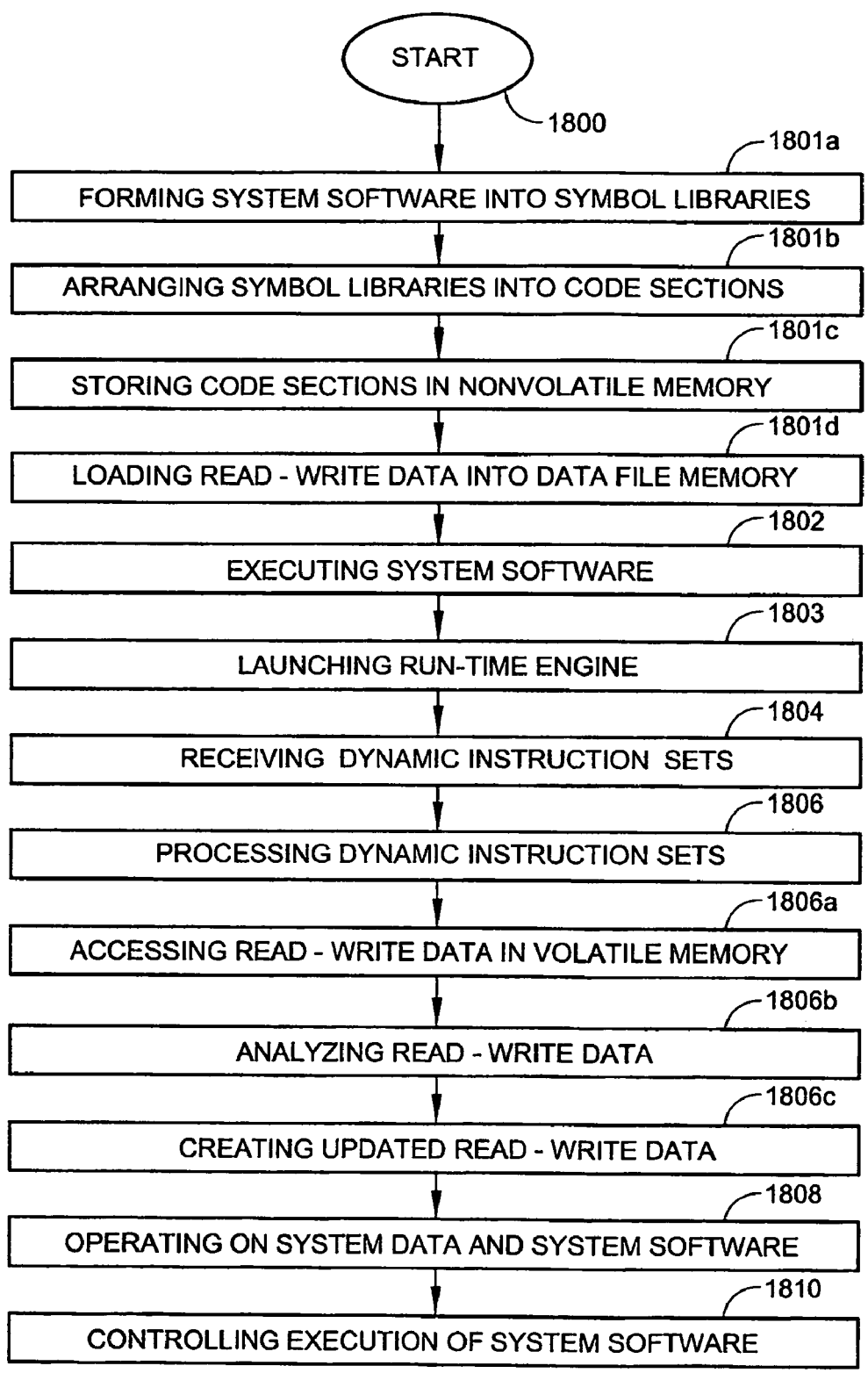
FIG. 18 is a flowchart illustrating a third exemplary dynamic instruction set operation.

FIG. 18 is a flowchart illustrating a third exemplary dynamic instruction set operation. Several of the Steps in FIG. 18 are the same as in FIG. 15, and are not repeated here in the interest of brevity. Step 1801c stores a plurality of code sections in a code storage section nonvolatile memory. Step 1801d loads read-write data into volatile memory. Processing dynamic instruction sets in Step 1806 includes substeps. Step 1806a accesses the read-write data in volatile memory. Step 1806b analyzes the read-write data. Step 1806c creates updated read-write data. Operating on the system data and system software in Step 1808 includes replacing the read-write data in volatile memory with the updated read-write data. Controlling the execution of the system software in Step 1810 includes using the updated read-write data in the execution of the system software.

Figure 19:
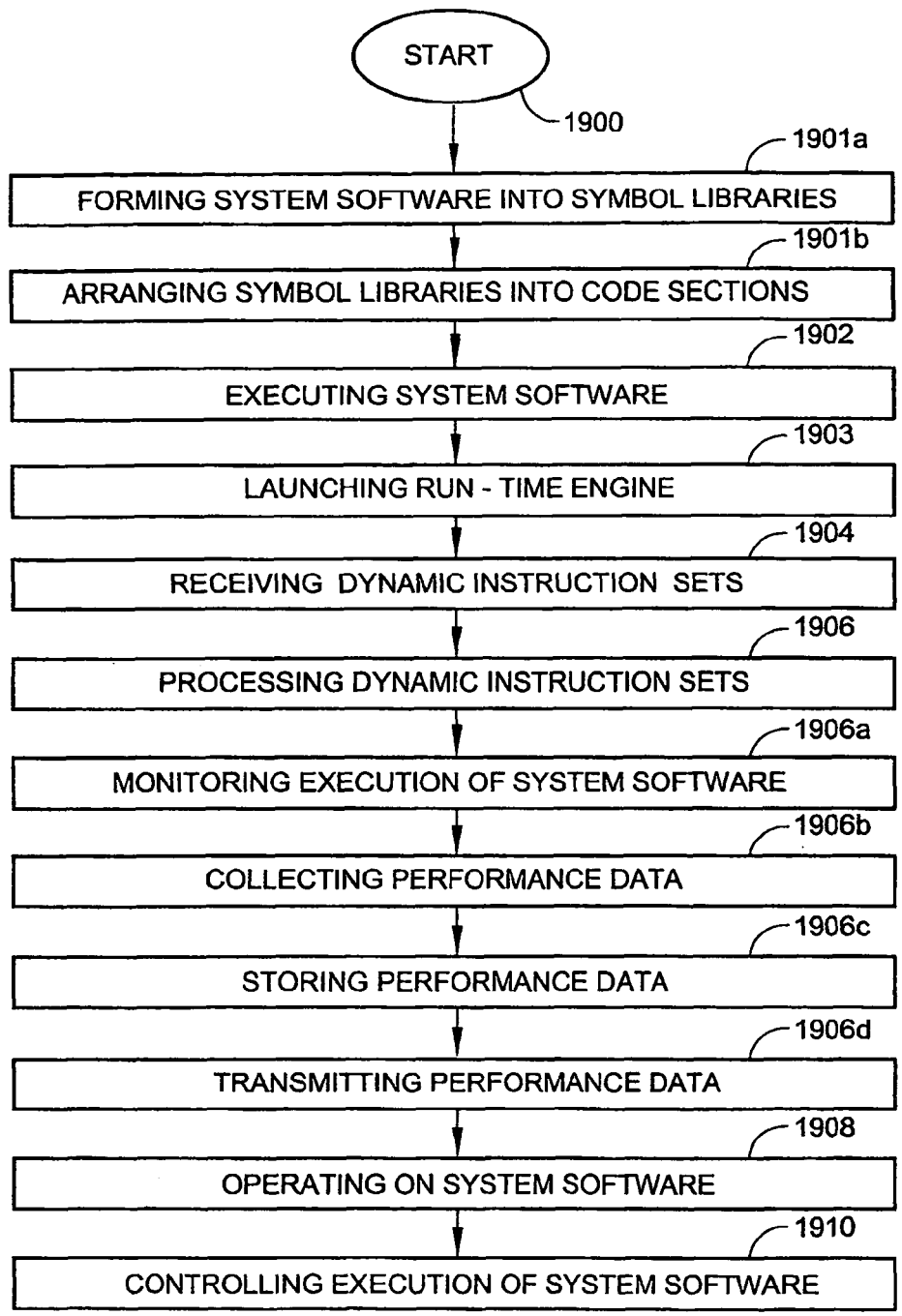
FIG. 19 is a flowchart illustrating a fourth exemplary dynamic instruction set operation.

FIG. 19 is a flowchart illustrating a fourth exemplary dynamic instruction set operation. Several of the Steps in FIG. 19 are the same as in FIG. 15, and are not repeated here in the interest of brevity. Processing dynamic instruction sets includes substeps. Step 1906a, in response to the operation code, monitors the execution of the system software. Step 1906b collects performance data. Step 1906c stores the performance data. Step 1906d transmits the stored data via an airlink interface. Operating on the system data and system software in Step 1908 includes using the performance data in the evaluation of system software. Step 1910 controls the execution of the system software.

Figure 20:
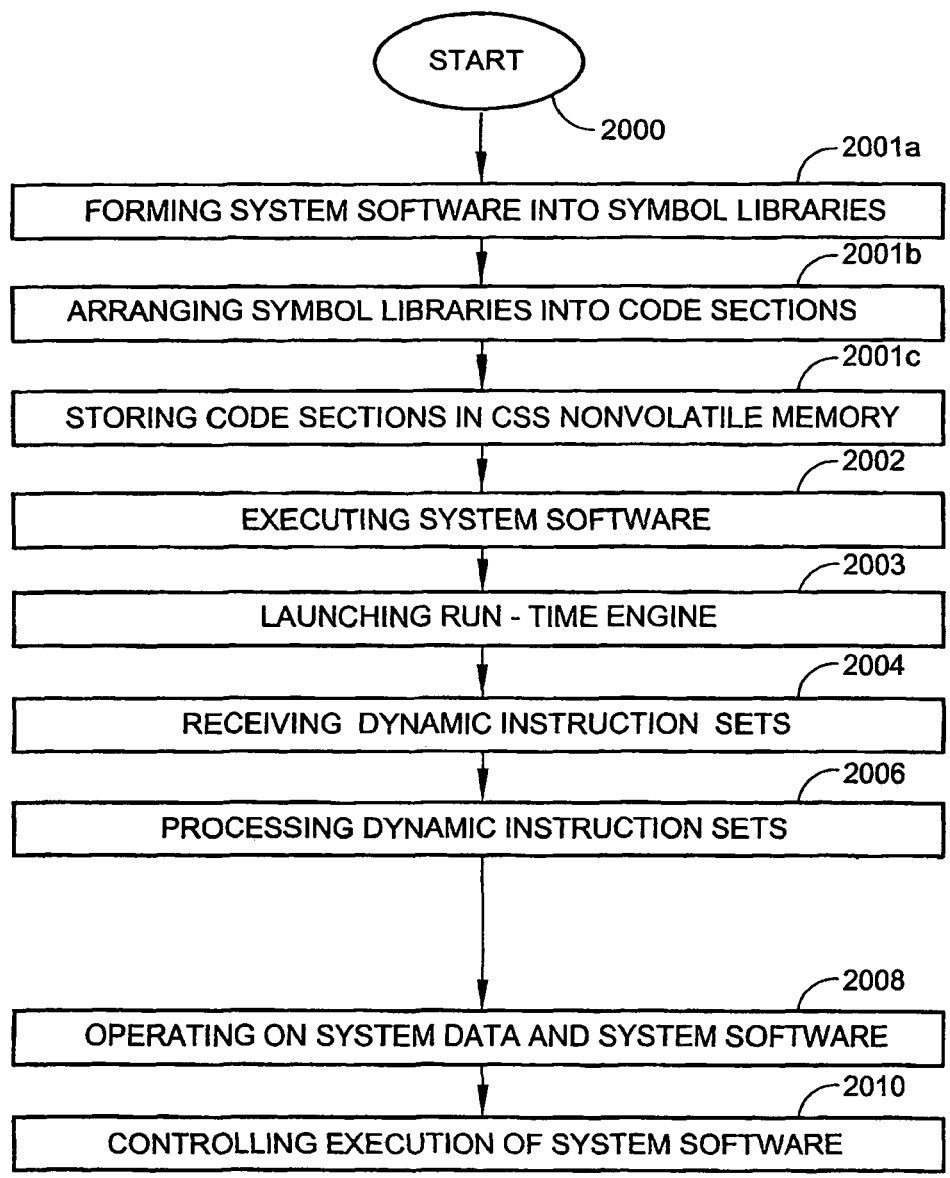
FIG. 20 is a flowchart illustrating a fifth exemplary dynamic instruction set operation.

FIG. 20 is a flowchart illustrating a fifth exemplary dynamic instruction set operation. Several of the Steps in FIG. 20 are the same as in FIG. 15, and are not repeated here in the interest of brevity. Step 2001c stores a plurality of code sections in a code storage section nonvolatile memory. Receiving patch manager run time instructions in Step 2003 includes receiving a new code section. Operating on the system data and system software in Step 2008 includes adding the new code section to the code storage section, and controlling the execution of the system software in Step 2010 includes using the new code section in the execution of the system software.

Alternately, receiving a new code section in Step 2003 includes receiving an updated code section. Then, operating on the system data and system software in Step 2008 includes replacing a fourth code section in the code storage section with the updated code section.

Figure 21:
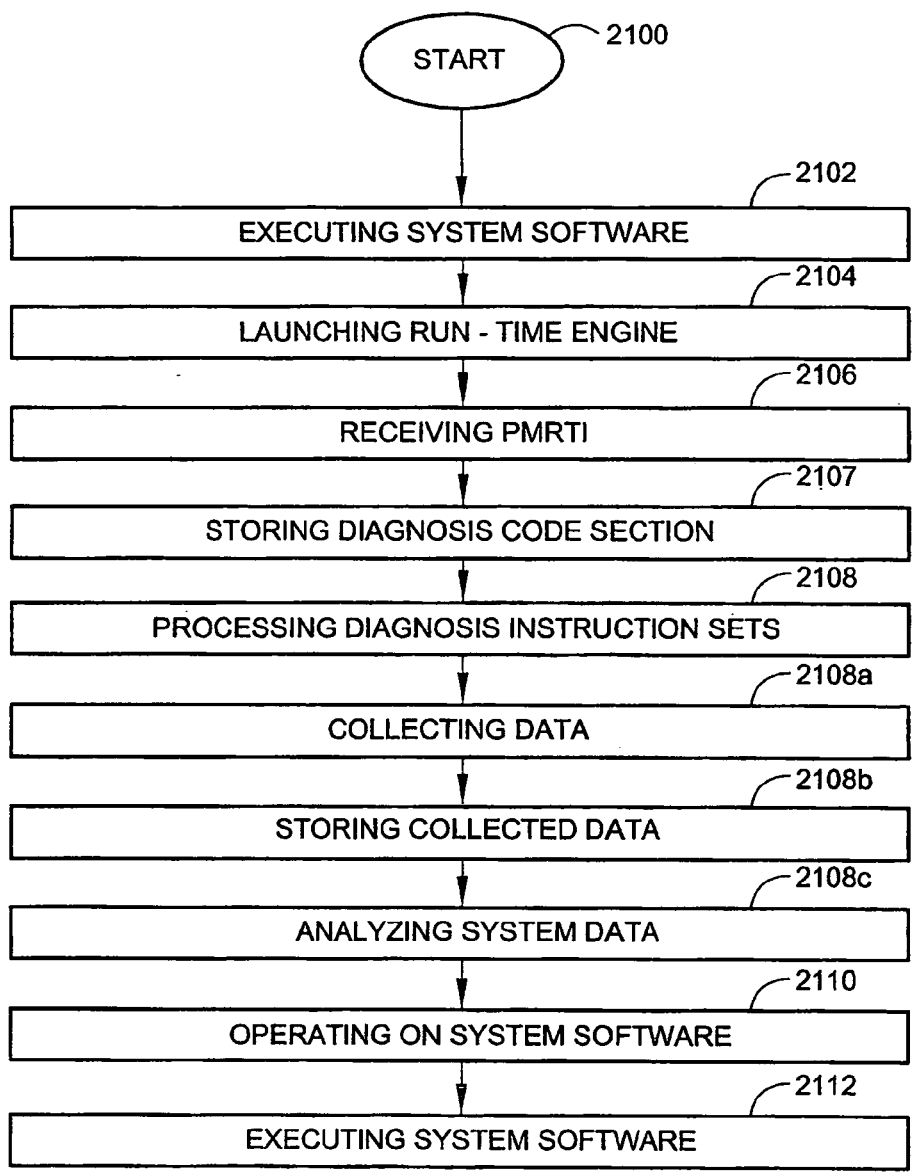
FIG. 21 is a flowchart illustrating the present invention method for field diagnosing system software in a wireless communications device.

FIG. 21 is a flowchart illustrating the present invention method for field diagnosing system software in a wireless communications device. The method starts at Step 2100. Step 2102 executes system software. Step 2104 launches a runtime engine. Step 2106 receives patch manager run time instructions (PMRTI), including dynamic instruction sets and new code sections, in a file system section nonvolatile memory. Step 2108 processes dynamic instruction sets to field diagnose the system software. Step 2110, in response to field diagnosing the system software in Step 2108, operates on system data and system software. Following the operating on the system software and system data in Step 2110, Step 2112 executes the system software.

As described earlier but not specifically shown in this figure, Step 2101a forms the system software into symbol libraries, each symbol library comprising symbols having related functionality and Step 2101b arranges the symbol libraries into code sections in a code storage section nonvolatile memory.

In some aspects of the invention, receiving dynamic instruction sets in Step 2106 includes receiving diagnosis instruction sets. Further, receiving a new code section includes receiving a diagnosis code section. Then, Step 2107 stores the diagnosis code sections in nonvolatile memory permanent storage, and processing dynamic instruction sets in Step 2108 includes processing the diagnosis instruction set to execute the diagnosis code section with the system software.

In some aspects of the invention the processing of diagnosis instruction sets in Step 2108 includes substeps. Step 2108a collects system data. Typically, system data is collected in response to executing the diagnosis code section with the system software. In some aspects, the collecting of system data in Step 2108a includes collecting the addresses and values of symbols in read-write volatile memory. Step 2108b stores the collected system data in a first code section in the file system section. Step 2108c uses conditional operation code to analyze the collected data. Then, operating on the system data and system software in Step 2110 includes updating the system data in response to analyzing the collected data. Executing the system software in Step 2112 includes using the updated system data. It should be understood that the order of collecting, storing, and analyzing the data in Steps 2108a through 2108c is not necessarily in the sequence depicted. Some processes are iterative, involving cycles of collecting, storing, and analyzing. Another process might analyze the data and then store it. Other variations of collecting, storing, and analyzing exist, as will be appreciated by those skilled in the art.

In some aspects of the invention receiving a diagnosis code section in Step 2106 includes receiving predetermined sets of updated system data. Processing diagnosis instruction sets in Step 2108 includes selecting an updated system data set and operating on the system data and system software in Step 2110 includes using the selected updated system data set to execute the system software.

Figure 22:
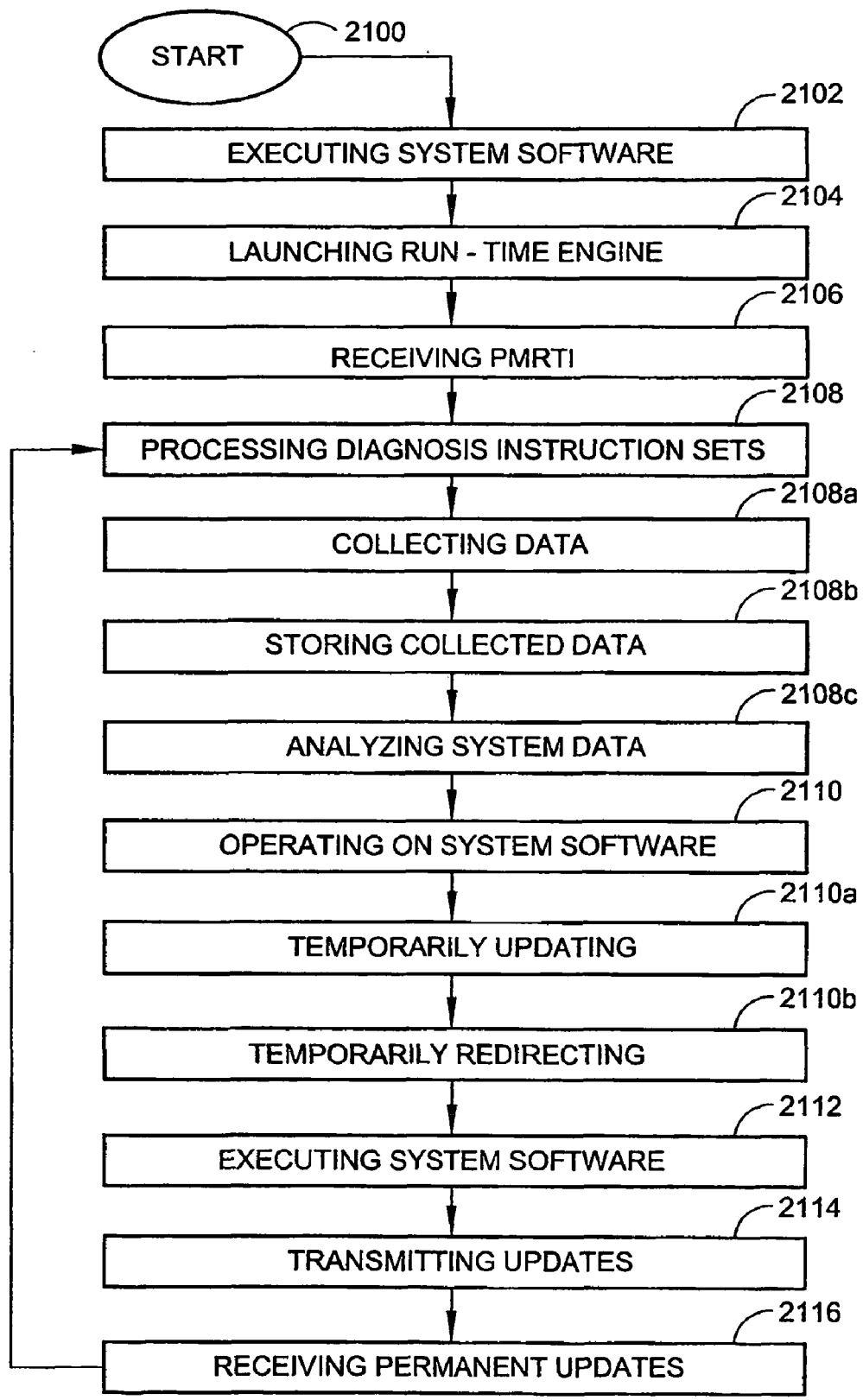
FIG. 22 is a flowchart illustrating additional features of the present invention method presented in FIG. 21.

FIG. 22 is a flowchart illustrating additional features of the present invention method presented in FIG. 21. In the interest of brevity it is noted that most of the steps described in FIG. 21 are the same as in FIG. 22, and their description is not repeated here. Receiving a diagnosis code section in Step 2106 includes receiving a test code section having a plurality of temporary code symbol libraries and corresponding constraints. Processing diagnosis instruction sets in Step 2108 includes executing a first temporary code. Analyzing the collected data in Step 2108c includes comparing system data, collected in response to executing the first temporary code, to the corresponding constraints. Operating on the system data and system software in Step 2110 includes substeps. Step 2110a temporarily updates the software data per the first temporary code constraints if the collected system data passes analysis. Step 2110b temporarily redirects selected system software symbols to counterpart symbols in the first temporary code symbol library of the diagnosis code section. If the collected system data does not pass analysis, processing diagnosis instruction sets in Step 2108 includes executing alternate temporary code symbol libraries.

Arranging the symbol libraries into code sections in Step 2101b includes starting symbol libraries at the start of code sections, and arranging symbols to be offset from their respective code section start addresses. As mentioned in detail above and, therefore not shown, Step 2101c stores the start of code sections at corresponding start addresses. Step

2101d maintains a code section address table cross-referencing code section identifiers with corresponding start addresses. Step 2101e maintains a symbol offset address table cross-referencing symbol identifiers with corresponding offset addresses and corresponding code section identifiers. Then, executing temporary code symbol libraries from the test code sections in Step 2112 includes updating the symbol offset address table and code section address table with addresses in the diagnosis code section.

In some aspects, receiving a diagnosis code section in Step 2106 includes receiving a test code section with temporary code symbol library and constraints organized as system data trigger values. Then, analyzing the collected data in Step 2108c includes comparing system data, collected in response to executing the first temporary code, to the sets of system data trigger values.

Step 2114 transmits the collection of temporary software data updates and temporarily redirects system software symbols via an airlink interface. Step 2116 receives an updated code section (a permanent update) with an updated code section address table and updated symbol offset address table in the file system section. Then, processing dynamic instruction sets in Step 2108 includes storing the updated code section with updated code section address table and symbol offset address table in permanent storage.

Figure 23:
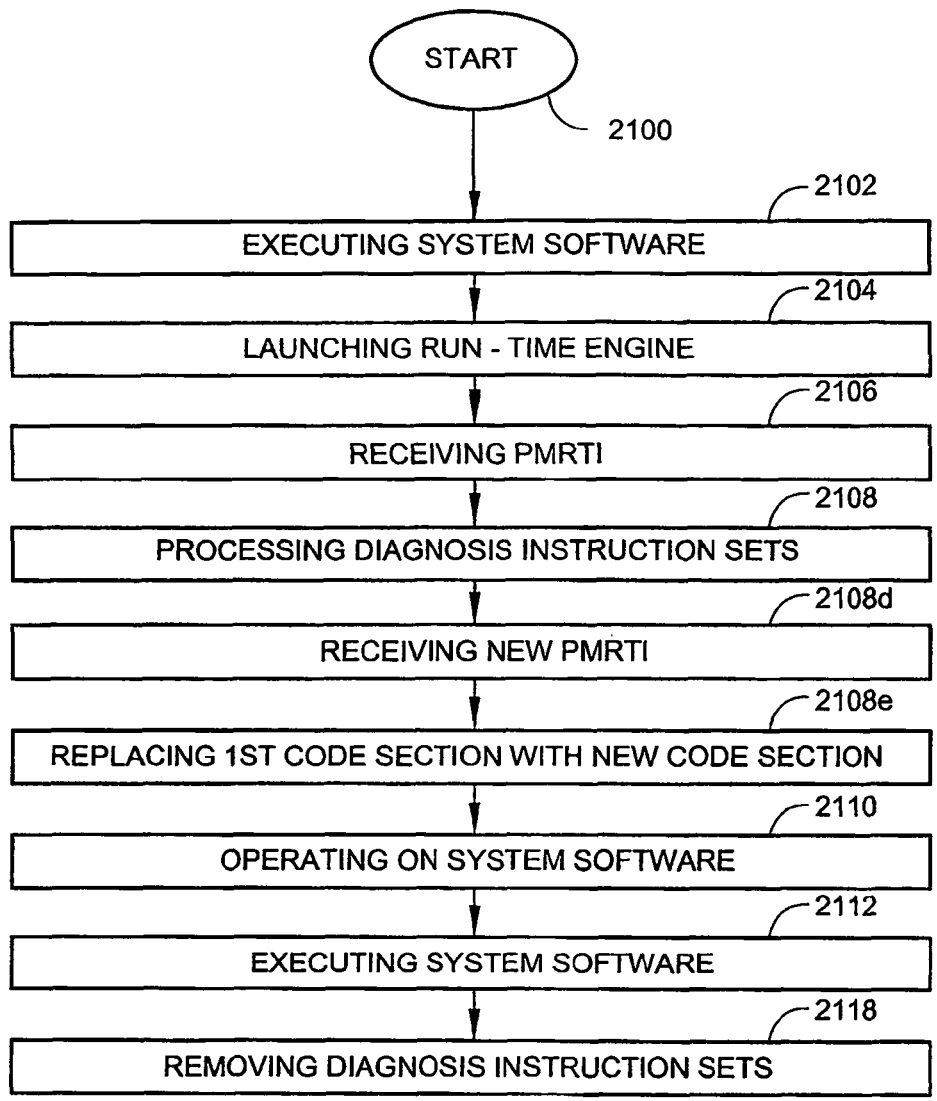
FIG. 23 is a flowchart illustrating an external analysis feature of the field diagnosis method of FIG. 21.

FIG. 23 is a flowchart illustrating an external analysis feature of the field diagnosis method of FIG. 21. Again, most of the steps in FIG. 23 are the same as the steps of FIG. 21, and will not be repeated in the interest of brevity. Processing diagnosis instruction sets in Step 2108 includes transmitting the collected system data via an airlink interface. After external analysis, Step 2108d receives a new patch manager run time instruction with a new code section including updated data. Step 2108e replaces a first code section in permanent storage with the new code section. Then, executing the system software in Step 2112 includes using the new code section. In some aspects of the invention, Step 2118, following the field diagnosis of the system software in Step 2108, removes the dynamic (diagnosis) instructions sets from the file system section.

A system and method have been provided for executing dynamic instruction sets in a wireless communications device, so as to aid in the diagnosis and/or fixing, at least temporarily, of system software problems. The system is easily updateable because of the arrangement of symbol libraries in code sections, with tables to access the start addresses of the code sections in memory and the offset addresses of symbols in the symbol libraries. The use of dynamic instruction sets permits custom modifications to be performed to each wireless device, based upon specific characteristics of that device. A few general examples have been given illustrating possible uses for the dynamic instructions sets. However, the present invention is not limited to just these examples. Other variations and embodiments of the invention will occur to those skilled in the art.

I claim:

1. In a wireless communications device, a method implemented by a processor for field diagnosing system software, the method comprising:
   executing, via the processor, system software, the system software including system data;
   launching, via the processor, a run-time engine;
   receiving patch manager run time instructions (PMRTI), including dynamic instruction sets comprising diagnosis instruction sets and new code sections comprising a diagnosis code section including predetermined sets of updated system data and storing the diagnosis code sections in nonvolatile memory permanent storage in a file system section of nonvolatile memory, wherein processing diagnosis instruction sets includes selecting an updated system data set; and, wherein operating on the system data and system software includes using the selected updated system data set to execute the system software;
   processing, via the processor, dynamic instruction sets to field diagnose the system software, wherein the dynamic instruction sets are dynamically loaded and continuously executed in real-time without interruption;
   in response to field diagnosing the system software, updating, via the processor, at least a portion of the system data and system software; and
   following the operating on the system software and system data, re-executing, via the processor, the system software.

2. The method of claim 1 further comprising:
   forming the system software into symbol libraries, each symbol library comprising symbols having related functionality; and
   arranging the symbol libraries into code sections in a code storage section nonvolatile memory.

3. The method of claim 1 wherein processing diagnosis instruction sets includes collecting system data.

4. The method of claim 3 wherein processing diagnosis instruction sets includes, in response to executing the diagnosis code section with the system software, collecting system data.

5. The method of claim 3 wherein collecting system data includes collecting the addresses and values of symbols in read-write volatile memory.

6. The method of claim 3 wherein processing diagnosis instruction sets includes storing the collected system data in a first code section in the file system section.

7. The method of claim 3 wherein processing diagnosis instruction sets includes using conditional operation code to analyze the collected data.

8. The method of claim 7 wherein operating on the system data and system software includes updating the system data in response to analyzing the collected data; and, wherein executing the system software includes using the updated system data.

9. In a wireless communications device, a method implemented by a processor for field diagnosing system software, the method comprising:
   executing, via the processor, system software, the system software including system data;
   launching, via the processor, a run-time engine;
   processing, via the processor, dynamic instruction sets to field diagnose the system software;
   in response to field diagnosing the system software, updating, via the processor, at least a portion of the system data and system software;
   following the operating on the system software and system data, re-executing, via the processor, the system software;
   forming the system software into symbol libraries, each symbol library comprising symbols having related functionality;
   arranging the symbol libraries into code sections in a code storage section nonvolatile memory; and,
   receiving patch manager run time instructions (PMRTI), including dynamic instruction sets and new code sections, in a file system section nonvolatile memory,
   wherein receiving dynamic instruction sets includes receiving diagnosis instruction sets, and wherein receiving a new code section includes receiving a diagnosis code section; the method further comprising: storing the diagnosis code sections in nonvolatile memory permanent storage; and, wherein processing dynamic instruction sets includes processing the diagnosis instruction set to execute the diagnosis code section with the system software, wherein processing diagnosis instruction sets includes collecting system data, wherein processing diagnosis instruction sets includes, in response to executing the diagnosis code section with the system software, collecting system data, wherein receiving a diagnosis code section includes receiving predetermined sets of updated system data; wherein processing diagnosis instruction sets includes selecting an updated system data set; and, wherein operating on the system data and system software includes using the selected updated system data set to execute the system software, and wherein receiving a diagnosis code section includes receiving a test code section having a plurality of temporary code symbol libraries and corresponding constraints;

wherein processing diagnosis instruction sets includes executing a first temporary code;

wherein analyzing the collected data includes comparing system data, collected in response to executing the first temporary code, to the corresponding constraints;

wherein operating on the system data and system software includes:

temporarily updating the software data per the first temporary code constraints if the collected system data passes analysis; and, temporarily redirecting selected system software symbols to counterpart symbols in the first temporary code symbol library of the diagnosis code section; and, wherein processing diagnosis instruction sets includes executing alternate temporary code symbol libraries if the collected system data does not pass analysis.

10. The method of claim 9 wherein arranging the symbol libraries into code sections includes starting symbol libraries at the start of code sections and arranging symbols to be offset from their respective code section start addresses; the method further comprising:

storing the start of code sections at corresponding start addresses;

maintaining a code section address table cross-referencing code section identifiers with corresponding start addresses;

maintaining a symbol offset address table cross-referencing symbol identifiers with corresponding offset addresses and corresponding code section identifiers; and, wherein executing temporary code symbol libraries from the test code sections includes updating the symbol offset address table and code section address table with addresses in the diagnosis code section.

11. The method of claim 10 wherein receiving a diagnosis code section includes receiving a test code section with temporary code symbol library and constraints organized as system data trigger values; and, wherein analyzing the collected data includes comparing system data, collected in response to executing the first temporary code, to the sets of system data trigger values.

12. The method of claim 10 further comprising:

transmitting the collection of temporary software data updates and temporarily redirected system software symbols via an airlink interface;

receiving an updated code section with an updated code section address table and updated symbol offset address table in the file system section; and, wherein processing diagnosis instruction sets includes storing the updated code section with updated code section address table and symbol offset address table in permanent storage.

13. The method of claim 9 wherein processing diagnosis instruction sets includes transmitting the collected system data via an airlink interface;

the method further comprising:

receiving a new patch manager run time instruction with a new code section including updated data;

replaced a first code section in permanent storage with the new code section; and, executing the system software using the new code section.

14. The method of claim 9 further comprising:

following the field diagnosis of the system software, removing the dynamic instructions sets from the file system section.

15. A computer readable storage medium having stored thereon one or more sequences of instructions for causing one or more processors to perform the steps for field diagnosing system software, the steps comprising:

executing system software, the system software including system data;

launching a run-time engine; and, ps receiving patch manager run time instructions (PMRTI), including dynamic instruction sets comprising diagnosis instruction sets and new code sections comprising a diagnosis code section including predetermined sets of updated system data and storing the diagnosis code sections in nonvolatile memory permanent storage in a file system section of nonvolatile memory, wherein processing diagnosis instruction sets includes selecting an updated system data set; and, wherein operating on the system data and system software includes using the selected updated system data set to execute the system software;

processing dynamic instruction sets to field diagnose the system software, wherein the dynamic instruction sets are dynamically loaded and continuously executed in real-time without interruption;

in response to field diagnosing the system software, updating at least a portion of the system data and system software; and following the operating on the system software and system data, re-executing the system software.

16. The computer readable storage medium of claim 15 further comprising:

forming the system software into symbol libraries, each symbol library comprising symbols having related functionality; and arranging the symbol libraries into code sections in a code storage section nonvolatile memory.

17. The computer readable storage medium of claim 15 wherein processing diagnosis instruction sets includes collecting system data.

18. The computer readable storage medium of claim 17 wherein processing diagnosis instruction sets includes, in response to executing the diagnosis code section with the system software, collecting system data.

19. The computer readable storage medium of claim 17 wherein collecting system data includes collecting the addresses and values of symbols in read-write volatile memory.

20. The computer readable storage medium of claim 17 wherein processing diagnosis instruction sets includes storing the collected system data in a first code section in the file system section.

21. The computer readable storage medium of claim 17 wherein processing diagnosis instruction sets includes using conditional operation code to analyze the collected data.

22. The computer readable storage medium of claim 21 wherein operating on the system data and system software includes updating the system data in response to analyzing the collected data; and, wherein executing the system software includes using the updated system data.

23. A computer readable storage medium having stored thereon one or more sequences of instructions for causing one or more processors to perform the steps for field diagnosing system software, the steps comprising:
    executing system software, the system software including system data;
    launching a run-time engine; and,
    processing dynamic instruction sets to field diagnose the system software;
    in response to field diagnosing the system software, updating at least a portion of the system data and system software;
    following the operating on the system software and system data, re-executing the system software;
    forming the system software into symbol libraries, each symbol library comprising symbols having related functionality;
    arranging the symbol libraries into code sections in a code storage section nonvolatile memory; and
    receiving patch manager run time instructions (PMRTI), including dynamic instruction sets and new code sections, in a file system section nonvolatile memory,
    wherein receiving dynamic instruction sets includes receiving diagnosis instruction sets, and wherein receiving a new code section includes receiving a diagnosis code section; further comprising: storing the diagnosis code sections in nonvolatile memory permanent storage; and, wherein processing dynamic instruction sets includes processing the diagnosis instruction set to execute the diagnosis code section with the system software,
    wherein processing diagnosis instruction sets includes collecting system data,
    wherein processing diagnosis instruction sets includes, in response to executing the diagnosis code section with the system software, collecting system data,
    wherein receiving a diagnosis code section includes receiving predetermined sets of updated system data; wherein processing diagnosis instruction sets includes selecting an updated system data set; and, wherein operating on the system data and system software includes using the selected updated system data set to execute the system software,
    wherein receiving a diagnosis code section includes receiving a test code section having a plurality of temporary code symbol libraries and corresponding constraints;
    wherein processing diagnosis instruction sets includes executing a first temporary code;
    wherein analyzing the collected data includes comparing system data, collected in response to executing the first temporary code, to the corresponding constraints;
    wherein operating on the system data and system software includes:
    temporarily updating the software data per the first temporary code constraints if the collected system data passes analysis; and,
    temporarily redirecting selected system software symbols to counterpart symbols in the first temporary code symbol library of the diagnosis code section; and,
    wherein processing diagnosis instruction sets includes executing alternate temporary code symbol libraries if the collected system data does not pass analysis.

24. The computer readable storage medium of claim 23 wherein arranging the symbol libraries into code sections includes starting symbol libraries at the start of code sections and arranging symbols to be offset from their respective code section start addresses; further comprising:
    storing the start of code sections at corresponding start addresses;
    maintaining a code section address table cross-referencing code section identifiers with corresponding start addresses;
    maintaining a symbol offset address table cross-referencing symbol identifiers with corresponding offset addresses and corresponding code section identifiers; and,
    wherein executing temporary code symbol libraries from the test code sections includes updating the symbol offset address table and code section address table with addresses in the diagnosis code section.

25. The computer readable storage medium of claim 24 wherein receiving a diagnosis code section includes receiving a test code section with temporary code symbol library and constraints organized as system data trigger values; and, wherein analyzing the collected data includes comparing system data, collected in response to executing the first temporary code, to the sets of system data trigger values.

26. The computer readable storage medium of claim 24 further comprising:
    transmitting the collection of temporary software data updates and temporarily redirected system software symbols via an airlink interface;
    receiving an updated code section with an updated code section address table and updated symbol offset address table in the file system section; and,
    wherein processing diagnosis instruction sets includes storing the updated code section with updated code section address table and symbol offset address table in permanent storage.

27. The computer readable storage medium of claim 23 wherein processing diagnosis instruction sets includes transmitting the collected system data via an airlink interface; further comprising:
    receiving a new patch manager run time intruction with a new code section including updated data;
    replaced a first code section in permanent storage with the new code section; and,
    executing the system software using the new code section.

28. The computer readable storage medium of claim 23 further comprising: following the field diagnosis of the system software, removing the dynamic instructions sets from the file system section.

29. A wireless communication device comprising at least one processor communicatively coupled with at least one computer readable storage medium, wherein the processor is programmed to field diagnose system software by executing a method, the method comprising:
    executing system software, the system software including system data;
    launching a run-time engine; and, receiving patch manager run time instructions (PMRTI), including dynamic instruction sets comprising diagnosis instruction sets and new code sections comprising a diagnosis code section including predetermined sets of updated system data and storing the diagnosis code sections in nonvolatile memory permanent storage in a file system section of nonvolatile memory, wherein processing diagnosis instruction sets includes selecting an updated system data set; and, wherein operating on the system data and system software includes using the selected updated system data set to execute the system software;

processing dynamic instruction sets to field diagnose the system software, wherein the dynamic instruction sets are dynamically loaded and continuously executed in real-time without interruption;

in response to field diagnosing the system software, updating at least a portion of the system data and system software; and following the operating on the system software and system data, re-executing the system software.

30. The device of claim 29 wherein the method executed by the processor is further programmed to field diagnose system software by:

forming the system software into symbol libraries, each symbol library comprising symbols having related functionality; and arranging the symbol libraries into code sections in a code storage section nonvolatile memory.

31. The device of claim 29 wherein processing diagnosis instruction sets includes collecting system data.

32. The device of claim 31 wherein processing diagnosis instruction sets includes, in response to executing the diagnosis code section with the system software, collecting system data.

33. The device of claim 31 wherein collecting system data includes collecting the addresses and values of symbols in read-write volatile memory.

34. The device of claim 31 wherein processing diagnosis instruction sets includes storing the collected system data in a first code section in the file system section.

35. The device of claim 31 wherein processing diagnosis instruction sets includes using conditional operation code to analyze the collected data.

36. The device of claim 35 wherein operating on the system data and system software includes updating the system data in response to analyzing the collected data; and, wherein executing the system software includes using the updated system data.

37. A wireless communication device comprising at least one processor communicatively coupled with at least one computer readable storage medium, wherein the processor is programmed to field diagnose system software by executing a method, the method comprising:

executing system software, the system software including system data;

launching a run-time engine; and, processing dynamic instruction sets to field diagnose the system software;

in response to field diagnosing the system software, updating at least a portion of the system data and system software; and following the operating on the system software and system data, re-executing the system software;

forming the system software into symbol libraries, each symbol library comprising symbols having related functionality;

arranging the symbol libraries into code sections in a code storage section nonvolatile memory; and, receiving patch manager run time instructions (PMRTI), including dynamic instruction sets and new code sections, in a file system section nonvolatile memory, wherein receiving dynamic instruction sets includes receiving diagnosis instruction sets, and wherein receiving a new code section includes receiving a diagnosis code section; wherein the processor is further programmed to field diagnose system software by: storing the diagnosis code sections in nonvolatile memory permanent storage; and, wherein processing dynamic instruction sets includes processing the diagnosis instruction set to execute the diagnosis code section with the system software wherein processing diagnosis instruction sets includes collecting system data wherein processing diagnosis instruction sets includes, in response to executing the diagnosis code section with the system software, collecting system data;

wherein receiving a diagnosis code section includes receiving predetermined sets of updated system data; wherein processing diagnosis instruction sets includes selecting an updated system data set; and, wherein operating on the system data and system software includes using the selected updated system data set to execute the system software wherein receiving a diagnosis code section includes receiving a test code section having a plurality of temporary code symbol libraries and corresponding constraints;

wherein processing diagnosis instruction sets includes executing a first temporary code;

wherein analyzing the collected data includes comparing system data, collected in response to executing the first temporary code, to the corresponding constraints;

wherein operating on the system data and system software includes:

temporarily updating the software data per the first temporary code constraints if the collected system data passes analysis; and, temporarily redirecting selected system software symbols to counterpart symbols in the first temporary code symbol library of the diagnosis code section; and, wherein processing diagnosis instruction sets includes executing alternate temporary code symbol libraries if the collected system data does not pass analysis.

38. The device of claim 37 wherein arranging the symbol libraries into code sections includes starting symbol libraries at the start of code sections and arranging symbols to be offset from their respective code section start addresses; wherein the processor is further programmed to field diagnose system software by:

storing the start of code sections at corresponding start addresses;

maintaining a code section address table cross-referencing code section identifiers with corresponding start addresses;

maintaining a symbol offset address table cross-referencing symbol identifiers with corresponding offset addresses and corresponding code section identifiers; and, wherein executing temporary code symbol libraries from the test code sections includes updating the symbol offset address table and code section address table with addresses in the diagnosis code section.

39. The device of claim 38 wherein receiving a diagnosis code section includes receiving a test code section with temporary code symbol library and constraints organized as system data trigger values; and, wherein analyzing the collected data includes comparing system data, collected in response to executing the first temporary code, to the sets of system data trigger values.

40. The device of claim 38 wherein the processor is further programmed to field diagnose system software by:
  transmitting the collection of temporary software data updates and temporarily redirected system software symbols via an airlink interface;
  receiving an updated code section with an updated code section address table and updated symbol offset address table in the file system section; and,
  wherein processing diagnosis instruction sets includes storing the updated code section with updated code section address table and symbol offset address table in permanent storage.

41. The device of claim 37 wherein processing diagnosis instruction sets includes transmitting the collected system data via an airlink interface; wherein the processor is further programmed to field diagnose system software by:
  receiving a new patch manager run time instruction with a new code section including updated data;
  replaced a first code section in permanent storage with the new code section; and,
  executing the system software using the new code section.

42. The device of claim 37 wherein the processor is further programmed to field diagnose system software by: following the field diagnosis of the system software, removing the dynamic instructions sets from the file system section.

* * * * *

UNITED STATES PATENT AND TRADEMARK OFFICE
CERTIFICATE OF CORRECTION

PATENT NO. : 8,032,865 B2  Page 1 of 1
APPLICATION NO. : 11/174090
DATED : October 4, 2011
INVENTOR(S) : Gowri Rajaram It is certified that error appears in the above-identified patent and that said Letters Patent is hereby corrected as shown below:

Column 24,
Line 29, delete "launching a run-time engine; and, ps receiving patch man-" and replace with
-- launching a run-time engine; and, receiving patch man- --

Signed and Sealed this
Thirty-first Day of July, 2012

David J. Kappos
*Director of the United States Patent and Trademark Office*